United States Patent
Choi et al.

(10) Patent No.: US 8,270,426 B2
(45) Date of Patent: Sep. 18, 2012

(54) METHOD OF SELECTING MODULATION AND CODING SCHEME (MCS) INDEX IN A WIRELESS COMMUNICATION SYSTEM AND APPARATUS FOR IMPLEMENTING THE SAME

(75) Inventors: Jin Soo Choi, Anyang-si (KR); Min Seok Oh, Anyang-si (KR); Hyung Ho Park, Anyang-si (KR); Sung Ho Moon, Anyang-si (KR); Doo Hyun Sung, Anyang-si (KR); Jae Hoon Chung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 531 days.

(21) Appl. No.: 12/524,762

(22) PCT Filed: Jan. 24, 2008

(86) PCT No.: PCT/KR2008/000443
§ 371 (c)(1),
(2), (4) Date: Jul. 28, 2009

(87) PCT Pub. No.: WO2008/093964
PCT Pub. Date: Aug. 7, 2008

(65) Prior Publication Data
US 2010/0067367 A1 Mar. 18, 2010

(30) Foreign Application Priority Data

Jan. 30, 2007 (KR) .................. 10-2007-0009378
Feb. 9, 2007 (KR) .................. 10-2007-0014070

(51) Int. Cl.
*H04J 3/16* (2006.01)

(52) U.S. Cl. ........ 370/437; 370/210; 370/329; 455/102; 455/226.1

(58) Field of Classification Search .................. 370/210, 370/329, 437; 455/102, 226
See application file for complete search history.

(56) References Cited

U.S. PATENT DOCUMENTS

2005/0128976 A1    6/2005   Uehara et al.
(Continued)

FOREIGN PATENT DOCUMENTS

| EP | 1 024 622 A2 | 8/2000 |
| EP | 1 513 282 A2 | 3/2005 |
| EP | 1 534 039 A2 | 5/2005 |

(Continued)

OTHER PUBLICATIONS

Su, Hsuan-Jung, "On Adaptive Threshold Adjustment with Error Rate Constraints for Adaptive Modulation and Coding Systems with Hybrid ARQ," Fifth International Conference on Information Communications and Signal Processing, 2005, pp. 786-790.

*Primary Examiner* — Kibrom T Hailu
*Assistant Examiner* — Zewdu A Beyen
(74) *Attorney, Agent, or Firm* — Birch, Stewart, Kolasch & Birch, LLP

(57) ABSTRACT

A method of selecting a modulation and coding scheme (MCS) in a wireless communication system is disclosed. More specifically, the method includes selecting a MCS index having a coding rate that is greater than a specified coding rate threshold if a resource allocation scheme of a transmitting end employs a localized resource allocation scheme, and selecting the MCS index having the coding rate that is less than the specified coding rate threshold if the resource allocation scheme of the transmitting end employs the distributed resource allocation scheme.

10 Claims, 18 Drawing Sheets

U.S. PATENT DOCUMENTS

| | | |
|---|---|---|
| 2006/0023717 A1 | 2/2006 | Trachtman et al. |
| 2006/0251180 A1* | 11/2006 | Baum et al. .................... 375/260 |
| 2007/0165568 A1 | 7/2007 | Damnjanovic et al. |
| 2007/0189240 A1* | 8/2007 | Cho et al. ...................... 370/337 |
| 2007/0242636 A1* | 10/2007 | Kashima et al. .............. 370/329 |
| 2007/0268816 A1* | 11/2007 | Hosein .......................... 370/208 |
| 2011/0216849 A1 | 9/2011 | Kishiyama et al. |

FOREIGN PATENT DOCUMENTS

| | | |
|---|---|---|
| JP | 2003-259437 A | 9/2003 |
| JP | 2003-319007 A | 11/2003 |
| JP | 2009-527931 A | 7/2009 |
| WO | WO 2004/017554 A1 | 2/2004 |
| WO | WO 2006/109436 A1 | 10/2006 |

* cited by examiner

FIG. 3A

| D1 | D2 | D3 | D4 | D5 | D6 | D7 | · · · · |

FIG. 3B

| D1 | | D2 | | D3 | | D4 | · · · · |

FIG. 3C

| D1 | D2 | D3 | | D4 | D5 | D6 | | D7 | D8 | D9 | · · · · |

US 8,270,426 B2

METHOD OF SELECTING MODULATION AND CODING SCHEME (MCS) INDEX IN A WIRELESS COMMUNICATION SYSTEM AND APPARATUS FOR IMPLEMENTING THE SAME

TECHNICAL FIELD

The present invention relates to method of selecting a scheme, and more particularly, to method of selecting modulation and coding scheme (MCS) index in a wireless communication system and apparatus for implementing the same.

BACKGROUND ART

A next generation mobile wireless communication system generally provides a high speed multimedia service. With the use of multimedia service becoming more widespread, wireless communication users' demand and need for faster, more reliable, and better multimedia is growing.

To accommodate such a growing demand, research to provide more efficient and improved service is taking place. In other words, various methods of improving data transmission are being researched, and in particular, ways to improve use of frequency resources are being explored.

With fast growing use and popularity of multimedia and communication services, demand for faster and more reliable wireless communication services is also increasing at a fast rate. In order to accommodate such changing demands, the capacity of the wireless communication system needs to improve as well. To this end, the capacity can be improved by better utilizing and increasing the efficiency of the existing limited wireless resources.

DISCLOSURE OF THE INVENTION

Accordingly, the present invention is directed to method of selecting modulation and coding scheme (MCS) index in a wireless communication system and apparatus for implementing the same that substantially obviates one or more problems due to limitations and disadvantages of the related art.

An object of the present invention is to provide a method of selecting a modulation and coding scheme (MCS) in a wireless communication system.

Another object of the present invention is to provide a method of selecting a modulation and coding scheme (MCS) in a wireless communication system having a MCS index set comprised of MCS indices having the same frequency efficiency.

A further object of the present invention is to provide an apparatus for selecting a modulation and coding scheme (MCS) in a wireless communication system. Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of selecting a modulation and coding scheme (MCS) in a wireless communication system includes selecting a MCS index having a coding rate that is greater than a specified coding rate threshold if a resource allocation scheme of a transmitting end employs a localized resource allocation scheme, and selecting the MCS index having the coding rate that is less than the specified coding rate threshold if the resource allocation scheme of the transmitting end employs the distributed resource allocation scheme.

In another aspect of the present invention, a method of selecting a modulation and coding scheme (MCS) in a wireless communication system includes selecting as a resource allocation scheme a localized resource allocation scheme by a transmitting end if a selected MCS index has coding rate that is greater than a specified coding rate threshold, and selecting as the resource allocation scheme a distributed resource allocation scheme by the transmitting end if the selected MCS index has coding rate that is less than a specified coding rate threshold.

In a further aspect of the present invention, a method of selecting a modulation and coding scheme (MCS) in a wireless communication system includes receiving feedback information including frequency selectivity of a receiving channel, selecting a localized resource allocation scheme if the frequency selectivity is greater than a specified frequency selectivity threshold, and selecting a distributed resource allocation scheme if the frequency selectivity is less than the specified frequency selectivity threshold.

Yet, in another aspect of the present invention, a method of selecting a modulation and coding scheme (MCS) in a wireless communication system having a MCS index set comprised of MCS indices having the same frequency efficiency includes determining a resource allocation scheme of a transmitting end if a first MCS index is included in the MCS index set, wherein the first MCS index is determined based on a signal-to-noise (SNR) ratio of the receiving channel, selecting a second MCS index having a coding rate that is greater than a specified coding rate threshold if the resource allocation scheme of the transmitting end is a localized resource allocation scheme, and selecting a second MCS index having a coding rate that is less than the specified coding rate threshold if the resource allocation scheme of the transmitting end is a distributed resource allocation scheme.

In another aspect of the present invention, a method of selecting a modulation and coding scheme (MCS) in a wireless communication system having a MCS index set comprised of MCS indices having the same frequency efficiency includes determining whether a coding rate of the MCS index is greater than or equal to a specified coding rate threshold if the MCS index, determined based on a signal-to-noise (SNR) ratio of the receiving channel, is included in the MCS index set, selecting a localized resource allocation scheme if the coding rate of the MCS index is greater than the specified coding rate threshold, and selecting a distributed resource allocation scheme if the coding rate of the MCS index is less than the specified coding rate threshold.

In another aspect of the present invention, a method selecting a modulation and coding scheme (MCS) in a wireless communication system includes receiving information including a first MCS index from a receiving end, determining whether the first MCS index is included in a MCS index set, maintaining the first MCS index if the first MCS index is not included in the MCS index set, determining further whether the first MCS index has a coding rate that is greater than or equal to a specified coding rate threshold, selecting a second MCS index having a low coding rate from the MCS index set to replace the first MCS index if the first MCS index has the coding rate that is greater than or equal to the specified coding rate threshold, selecting the second MCS index having a high coding rate from the MCS index set to replace the first MCS index if the first MCS index has the coding rate that is less than the specified coding rate threshold.

In a further aspect of the present invention, an apparatus for selecting a modulation and coding scheme (MCS) in a wireless communication system includes a transmitting end which comprises a resource allocation module configured to use an adaptive resource allocation scheme or a non-adaptive resource allocation scheme, wherein the resource allocation scheme includes a localized resource allocation scheme, a distributed resource allocation scheme, and a scheme which is a combination of the localized and the distributed resource allocation scheme, and a MCS selection controller configured to select the MCS index having a coding rate greater than or equal to a specified coding rate threshold if the resource allocation scheme is the localized resource allocation scheme, and to select the MCS index having a coding rate less than the specified coding rate threshold if the resource allocation scheme is the distributed resource allocation scheme; and a receiving end which comprises a resource de-allocation module configured to collect information of the symbols allocated to the time-frequency domain.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings;

FIGS. 3A to 3C are exemplary diagrams illustrating resource allocation schemes in the OFDM system;

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
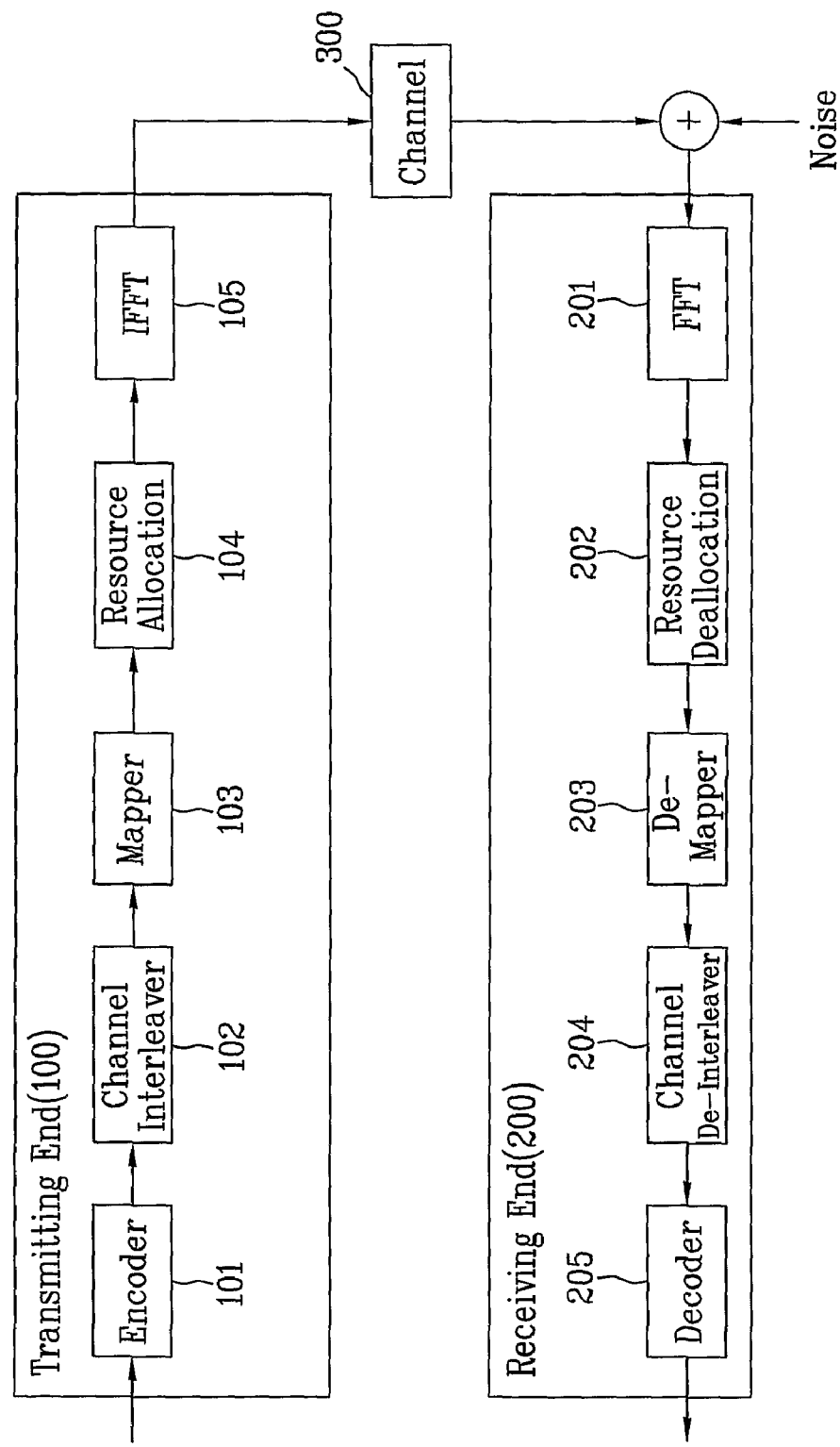
FIG. 1 is an exemplary diagram illustrating a structure comprises a transmitting end and a receiving end of an orthogonal frequency division multiplexing (OFDM) system.

FIG. 1 is an exemplary diagram illustrating a structure comprises a transmitting end and a receiving end of an orthogonal frequency division multiplexing (OFDM) system. Referring to FIG. 1, the OFDM system comprises, largely, a transmitting end 100 and a receiving end 200. The transmitting end 100 includes an encoder 101, a channel interleaver 102, a mapper 103, a resource allocation module 104, and an inverse fast Fourier transform (IFFT) module 105.

In operation, the encoder 101 can be configured to reduce the effects of coding data bits and/or effects of noise. The channel interleaver 102 can be configured to shuffle the coded bits so that burst error of a channel can be distributed. In addition, the mapper 103 can be configured to convert the bits outputted from the channel interleaver 102 into symbols. The resource allocation module 104 can be configured to allocate the symbols to resource blocks of the time-frequency domain of the transmit channel. Subsequently, the IFFT module 105 can be configured to modulate the symbols into OFDM symbols and sends them via a channel.

The receiving end 200 includes a fast Fourier transform (FFT) module 201, a resource de-allocation module 202, a demaper 203, a channel de-interleaver 204, and a decoder 205. More specifically, the FFT module 201 can be configured to convert the OFDM symbols, which were converted by the IFFT module 104, back to symbols. The resource de-allocation module 202 can be configured to collect information of the symbols allocated to the time-frequency domain. The de-mapper 203 can be configured to convert the symbols into bits. Thereafter, the de-interleaver 204 can be configured to arrange (or re-orders) the shuffled bits back to original arrangement or order. Moreover, the channel decoder 205 can be configured to output the processed (or estimated) data bits.

Referring to the transmitting end 100 of FIG. 1, it illustrates the resource allocation module 104 which is configured to allocate the resources using a fixed scheme. However, the OFDM system is not limited to using a fixed scheme for allocating resources but a variable scheme can be applied based on channel condition.

Figure 2:
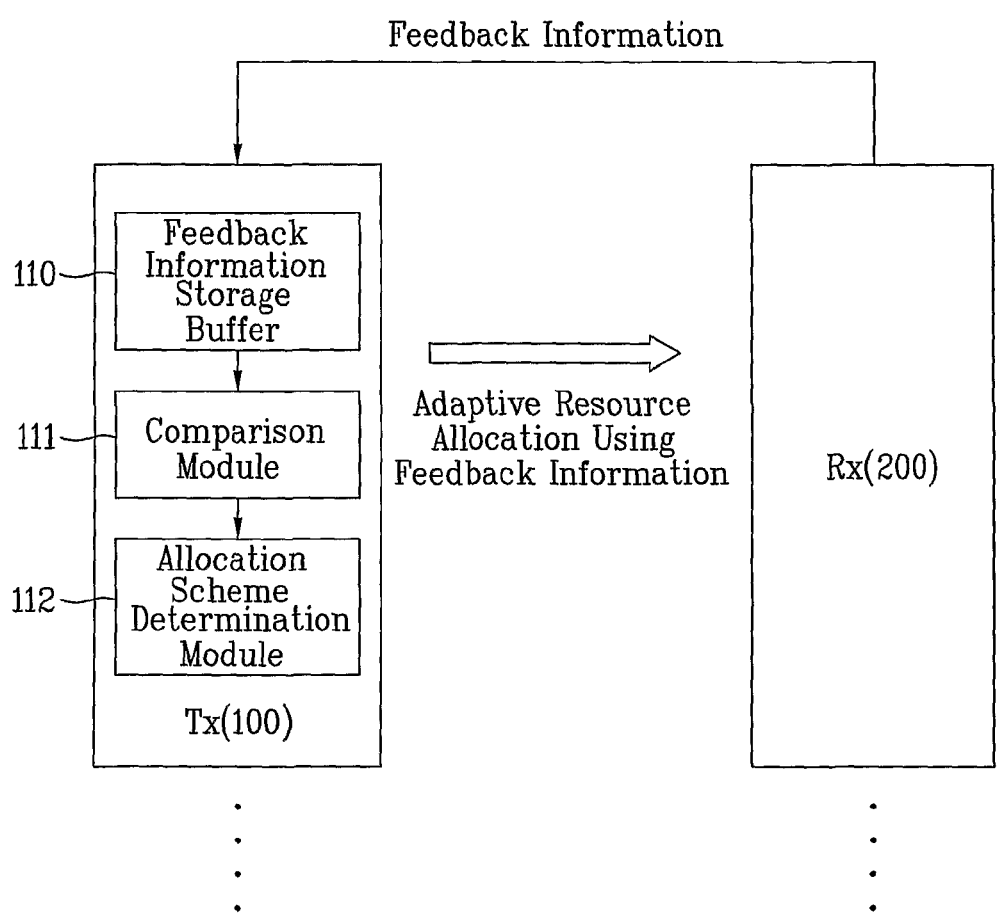
FIG. 2 is an exemplary diagram illustrating a structure of an adaptable resource allocation scheme in the OFDM system.

FIG. 2 is an exemplary diagram illustrating a structure of an adaptable resource allocation scheme in the OFDM system. Referring to FIG. 2, the transmitting end 100 receives feedback information from the receiving end 200. The feedback information can be associated with channel condition or channel status. After receiving the feedback information, the transmitting end 100 can store the feedback information in a feedback information storage buffer 110. Thereafter, the transmitting end 100 can determine which resource allocation scheme to use by comparing the stored feedback information with a specified standard value in a comparison module 111. Based on the comparison, a resource allocation determination module 112 can determine the applicable resource allocation scheme. The resource allocation module 104 of FIG. 1 can then use the determined resource allocation scheme to allocate the transmit information to time-frequency domain.

FIGS. 3A-3C are exemplary diagrams illustrating resource allocation schemes in the OFDM system. In the OFDM system, the data symbols can be allocated or mapped to each subcarrier of a physical channel for transmission. Here, there are various schemes that can be used for allocating the data to subcarriers.

In FIG. 3A, a localized allocation scheme is illustrated. The localized allocation scheme is a scheme that allocates the data to the subcarriers serially or in a contiguous manner. In FIG. 3B, a distributed allocation scheme is illustrated. The distributed allocation scheme is a scheme that allocates the data to the subcarriers in a non-localized, non-serial, or non-contiguous manner.

Moreover, the localized allocation scheme is channel dependent since the data is allocated to subcarriers in a contiguous manner. Alternatively, frequency diversity can be gained with the distributed allocation scheme since the data is allocated to subcarriers in distributive manner.

In FIG. 3C, the scheme illustrated here is a hybrid or a combination of the localized allocation scheme and the distributed allocation scheme. For example, if the user's mobility is considered significant which requires excessive signaling overhead, this hybrid scheme can be used. According to this hybrid scheme, the frequency diversity can be attained in groups, resulting in reduced diversity gain, and at the same time, the signaling overhead can be relatively reduced.

The following example relates to the communication system having adaptive resource allocation schemes. For example, if the user's mobility is significant, the channel condition changes accordingly. That is, if the channel condition changes, it may be difficult to sue schemes such as an adaptive modulation and coding (AMC) scheme and channel-dependent scheduling scheme.

If a communication system chooses to use the resource allocation scheme of FIG. 1 over the frequency diversity gain and serially allocate the data for transmission (e.g., the system of FIG. 3A employing the localized allocation scheme), the system performance can suffer sever deterioration due to changes in channel condition.

Conversely, if the communication system distributes data throughout the entire frequency bandwidth and allocates them to subcarriers so that frequency diversity gain can be attained (e.g., the system of FIG. 3B employing the distributed allocation scheme), the system performance can be reduced if the user's mobility is small compared to when the AMC scheme or the scheduling scheme is used.

As described with respect to FIG. 1, it may be difficult to optimize system performance using a fixed allocation scheme. It is important to determine the channel condition with respect to the user's mobility. Thereafter, as illustrated in FIG. 2, if the determined channel condition can then be sent or fed back to the transmitting end and used adaptively, then the system performance can maintain optimum level irrespective to the user's mobility.

In the OFDM system, the AMC scheme can be applied in order to adaptively control the coding rate of the encoder 101 and the modulation scheme of the mapper 103. The following figure can be used to illustrate this.

Figure 4:
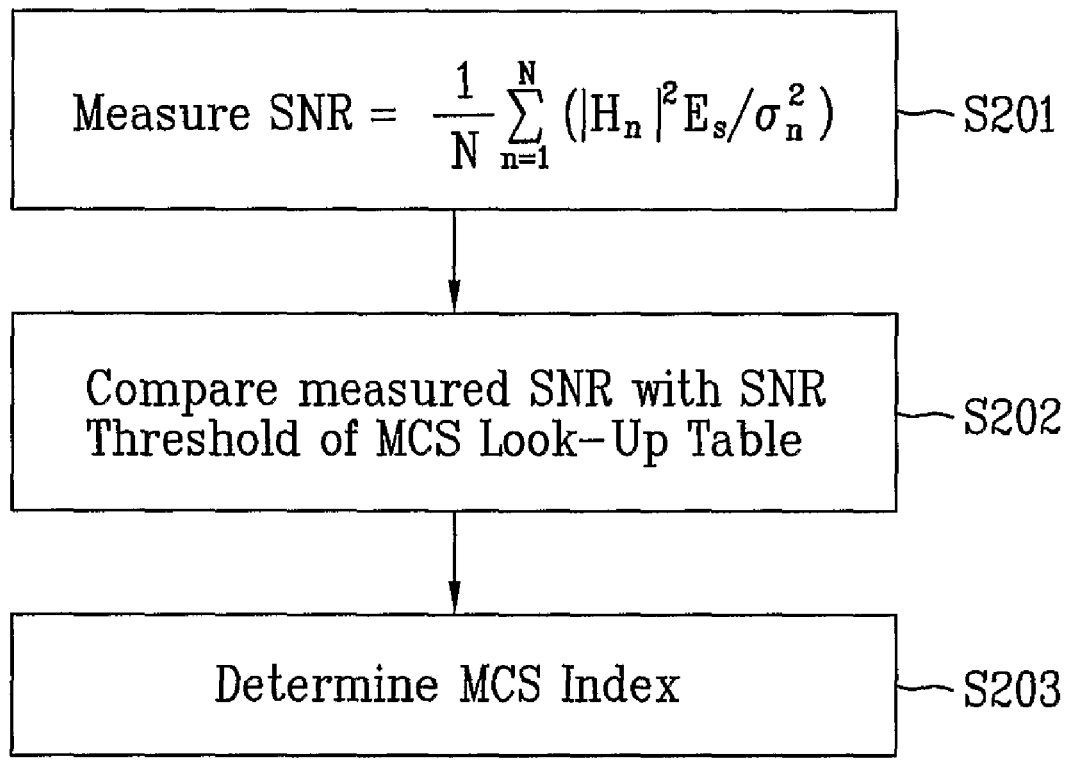
FIG. 4 is an exemplary diagram illustrating a OFDM system using the AMC scheme.

FIG. 4 is an exemplary diagram illustrating a OFDM system using the AMC scheme. Referring to FIG. 4, the AMC scheme can be configured to measure an average SNR for all subcarriers at the receiving end. Thereafter, a code rate (or coding rate) and/or modulation size for optimizing transmission rate of the data can be determined and selected. Here, the selection can be guided or restricted by a prescribed level of quality of service (QoS). Then, the MCS index corresponding to the selected coding rate and/or modulation size can be selected and only the MCS index can be transmitted to the transmitting end.

More specifically, the receiving end 200 uses the feedback information or channel responses to calculate the average SNR of all the subcarriers (S201). Here, the SNR can be calculated according to a following equation.

$$SNR = \frac{1}{N}\sum_{n=1}^{N}(|H_n|^2 E_S / \sigma_n^2) \quad \text{[Equation 1]}$$

Referring to Equation 1, N denotes a total number of subcarriers, $H_n$ denotes $n^{th}$ subcarrier of the channel response, $E_S$ denotes an average signal energy, and $\sigma_n^2$ denotes noise energy.

In subsequent steps (S202 and S203), the measured SNR from S201 can be used to select (or determine) the MCS index, which represents the optimized data rate, in view of a predetermined frame error rate (FER). More specifically, in S202, the measured SNR is compared with a SNR threshold for each level of link curve table included in the MCS look-up table 105. The MCS look-up table 105 includes the link curve table which represents the SNR threshold that satisfies the predetermined FER level. The SNR threshold can be determined by using simulation results according to all modulation sizes and coding rates used by the OFDM system. There can be various types of MCS look-up table, and the following tables represent an example of a MCS look-up table.

TABLE 1

| Level | Modulation | Code rate |
|-------|------------|-----------|
| 1 | QPSK | 1/3 |
| 2 | QPSK | 1/2 |
| 3 | QPSK | 2/3 |
| 4 | QPSK | 3/4 |
| 5 | 16QAM | 1/3 |
| 6 | 16QAM | 1/2 |
| 7 | 16QAM | 2/3 |
| 8 | 16QAM | 3/4 |
| 9 | 64QAM | 1/3 |
| 10 | 64QAM | 1/2 |
| 11 | 64QAM | 2/3 |
| 12 | 64QAM | 3/4 |

TABLE 2

| Level | Modulation | Code rate |
|-------|------------|-----------|
| 1 | QPSK | 1/3 |
| 2 | QPSK | 5/12 |
| 3 | QPSK | 1/2 |
| 4 | QPSK | 2/3 |
| 5 | QPSK | 3/4 |

TABLE 2-continued

| Level | Modulation | Code rate |
|---|---|---|
| 6 | QPSK | 5/6 |
| 7 | 16QAM | 1/3 |
| 8 | 16QAM | 5/12 |
| 9 | 16QAM | 1/2 |
| 10 | 16QAM | 2/3 |
| 11 | 16QAM | 3/4 |
| 12 | 16QAM | 5/6 |
| 13 | 64QAM | 1/3 |
| 14 | 64QAM | 5/12 |
| 15 | 64QAM | 1/2 |
| 16 | 64QAM | 2/3 |
| 17 | 64QAM | 3/4 |
| 18 | 64QAM | 5/6 |

As discussed, Tables 1 and 2 are examples of MCS look-up tables. Here, indication of a link curve table having SNR threshold corresponding to each MCS index is not shown. In step S202, the link curve table of the MCS look-up table can be used to determine a maximum level SNR threshold which satisfies the SNR measured in step S201.

Thereafter, in step S203, the measured SNR can be used in selection of the MCS index, which indicates a maximum SNR threshold from the link curve table, from the MCS look-up table. The MCS index can then be transmitted to the transmitting end 100 as feedback information.

After receiving the feedback information from the receiving end 200, the transmitting end 100 can use the MCS index (also referred to as "MCS level index") to determine the modulation rate and the coding rate to be used for data transmission. In other words, the MCS look-up table can be used to determine the modulation rate and the coding rate to be used for data transmission. Generally, the determined modulation rate and the coding rate are also applied uniformly to all the subcarriers.

Although the resource allocation scheme and the AMC scheme are closely related in terms of system performance, the information between the two schemes are not used well. For example, even if the adaptative resource allocation scheme of FIG. 2 is used, only the changes in channel condition with respect to the user's level of mobility is considered, and the relationship with the coding rate from the AMC scheme and the frequency diversity gain from the resource allocation scheme is not being considered.

Conversely, with respect to AMC scheme or selection of the MCS index, only the SNR of the received signal is considered and does not consider as to which scheme may be used for the resource allocation scheme in the transmitting end. In addition, the AMC scheme and the MCS index selection scheme fails to consider enough the various (and dynamic) channel conditions, including the channel selectivity of the receiving channel.

However, in the OFDM system, the degree or level of frequency diversity acquisition according to channel coding may be different. If the MCS level acquired from the SNR measurement according to the schemes described above, the frequency diversity based on channel coding may not be fully utilized thus the FER performance and/or the transmission rate may not be optimized. Furthermore, the degree of change with respect to the relationship between the resource allocation scheme of the transmitting end and the MCS index of the AMC scheme, and the coding rate according to the corresponding MCS index may be considered. Based on this, the MCS index may be selected and/or the resource allocation scheme may be selected.

Figure 5:
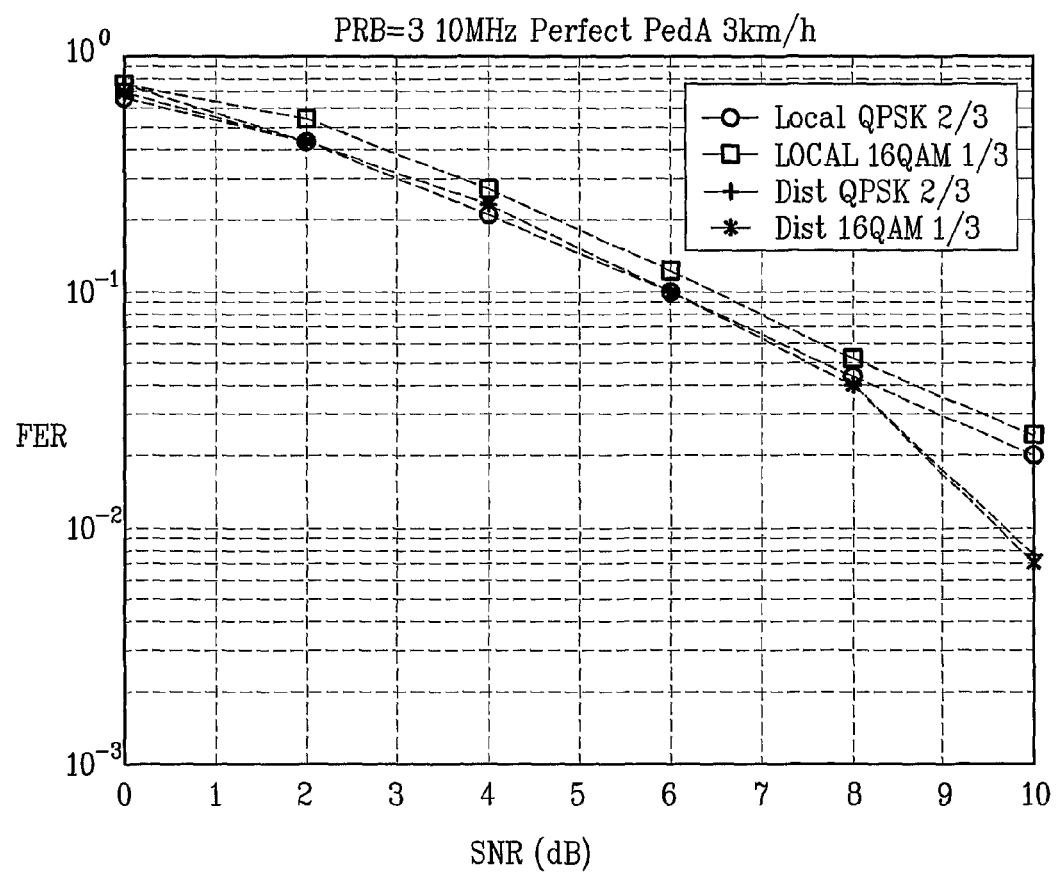
FIG. 5 is an exemplary graph illustrating performance comparisons according to modulation and coding scheme (MCS) in a channel environment having different frequency selectivity.
Figure 6:
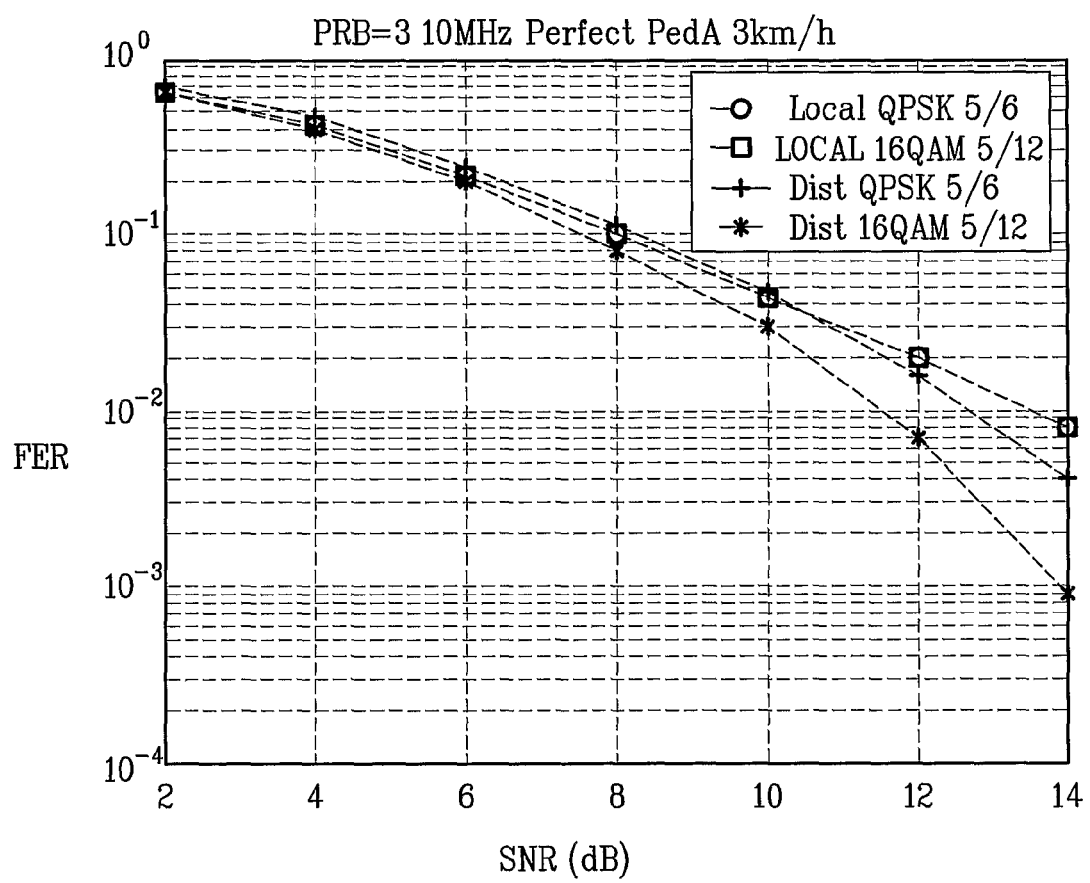
FIG. 6 is another exemplary graph illustrating performance comparisons according to modulation and coding scheme (MCS) in a channel environment having different frequency selectivity.

FIG. 5 and FIG. 6 are exemplary graphs illustrating performance comparisons according to modulation and coding scheme (MCS) in a channel environment having different frequency selectivity.

Referring to FIGS. 5 and 6, the performance results of the OFDM system applying two (2) MCS index (or MCS level index) having the same spectral efficiency are shown. Here, "Local" denotes a localized resource allocation scheme, and "Dist" denotes a distributed resource allocation scheme. Moreover, TU stands for "typical urban" and represents a channel environment having a relatively larger frequency selectivity. PEDA stands for "Pedestrian A" and represents a channel environment having a relatively smaller frequency selectivity. For both, a comparatively slow moving speed of 3 km/h is assumed, and there are two (2) receiving antennas to achieve antenna diversity. Based on these settings and assumption(s), simulations were conducted, and the results are shown in these figures.

As shown in FIG. 5, the two (2) MCS indices have the same frequency efficiency where a first is represented by a quadrature phase shift keying (QPSK) with 2/3 coding rate applied thereto, and a second is represented by a 16 quadrature amplitude modulation (16 QAM) with 1/3 coding rate applied thereto. In a channel environment where the localized allocation scheme is applied so as to attain scheduling gain, the FER performance (or FER results) of a situation where low modulation rate and high coding rate (e.g., QPSK, 2/3 coding rate) were applied outperformed another situation where high modulation rate and low coding rate (16QAM, 1/3 coding rate) were applied.

Alternatively, in a channel environment where the distributed allocation scheme is applied so as to attain frequency diversity gain, the FER performance (or FER results) of a situation where high modulation rate and low coding rate (e.g., 16QAM, 1/3 coding rate) were applied outperformed another situation where low modulation rate and high coding rate (e.g., QPSK, 2/3 coding rate) were applied.

If the frequency diversity gain is small, gain achieved from channel coding in the OFDM system is relatively small, and conversely, if the frequency diversity gain is large, gain achieved from channel coding in the OFDM system is relatively greater. More specifically, the performance (or results) of channel coding depends on amount or level of compensation of the subcarriers experiencing deep fading from performing channel coding in the OFDM system. Here, frequency diversity gained from channel coding is directly proportional to the size of frequency selectivity. In other words, if the frequency selectivity is large, then the frequency diversity gained from channel coding also increases. Consequently, it is advantageous to apply strong channel coding (or low coding rate). Conversely, if the frequency diversity is small (e.g., small frequency selectivity), it is more advantageous to transmit using high coding rate since the gain that can be achieved from channel coding is relatively smaller.

Referring to FIG. 6, the two (2) MCS indices have the same frequency efficiency where a first is represented by QPSK with 5/6 coding rate applied thereto, and a second is represented by 16QAM with 5/12 coding rate applied thereto. In the channel environment applying distributed resource allocation scheme so as to achieve relatively high frequency diversity gain, the FER performance (or FER results) is better in a situation where a comparatively lower coding rate (e.g., 16QAM, 5/12 coding rate) is applied than a situation where a comparatively larger coding rate (e.g., QPSK, 5/6 coding rate) is applied. Furthermore, compared to FIG. 5, the performance is superior to that of FIG. 5 as a result of the difference in the coding rate (e.g., QPSK, 5/6 coding rate versus 16QAM, 5/12 coding rate). With respect to FIG. 5, the performance is nearly saturated because strong channel coding is applied. However, a relatively weaker channel coding is applied, and therefore, there is greater difference in the frequency diversity gain can be achieved in FIG. 6 where relatively weaker channel coding is applied compared to that of FIG. 5.

In FIGS. 5 and 6, the simulation results were based on two (2) receiving antennas. If the simulations were run on a single receiving antenna, the difference would likely have been greater. Furthermore, if the channel environment was different (e.g., channel having higher frequency selectivity or channel having lower frequency selectivity), the performance difference would have been noticeably different.

As discussed, the performance of the system can vary according to the channel environment, and therefore, it is important to consider different and/or varying channel conditions. Without such considerations, the use of a fixed MCS index and application of the AMC scheme thereto would likely result in less-than-optimum system performance.

Figure 7:
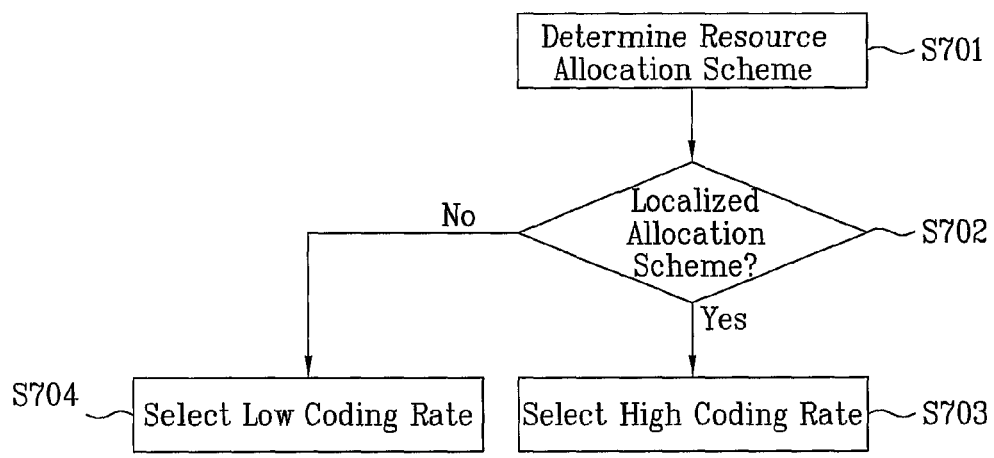
FIG. 7 is an exemplary diagram illustrating coding rate selection according to the resource allocation scheme of the transmitting end.

FIG. 7 is an exemplary diagram illustrating coding rate selection according to the resource allocation scheme of the transmitting end. Referring to FIG. 7, the resource allocation scheme of the transmitting end can be determined (S701). Here, the resource allocation scheme of the transmitting end can be any one of the localized resource allocation scheme of FIG. 3A, the distributed resource allocation scheme of FIG. 3B, or the hybrid (or combination) of the localized/distributed resource allocation scheme of FIG. 3C.

Thereafter, a determination can be made as to whether the resource allocation scheme of the transmitting end is a localized resource allocation scheme or a distributed resource allocation scheme (S702).

If it is determined that the transmitting end uses the localized resource allocation scheme, a relatively high coding rate can be selected according to the AMC scheme (S703). That is, the MCS index having relative high coding rate, from the MCS index set in which the MCS indices having the same frequency efficiency, or the MCS index having the code rate greater than or equal to a threshold coding rate can be selected.

Alternatively, if it is determined that the transmitting end uses the distributed resource allocation scheme, a relatively low coding rate can be selected according to the AMC scheme (S704).

The MCS index selection scheme as discussed in FIG. 7 can be applied in a system employing adaptive resource allocation scheme as well as in a system employing fixed resource allocation scheme.

Figure 8:
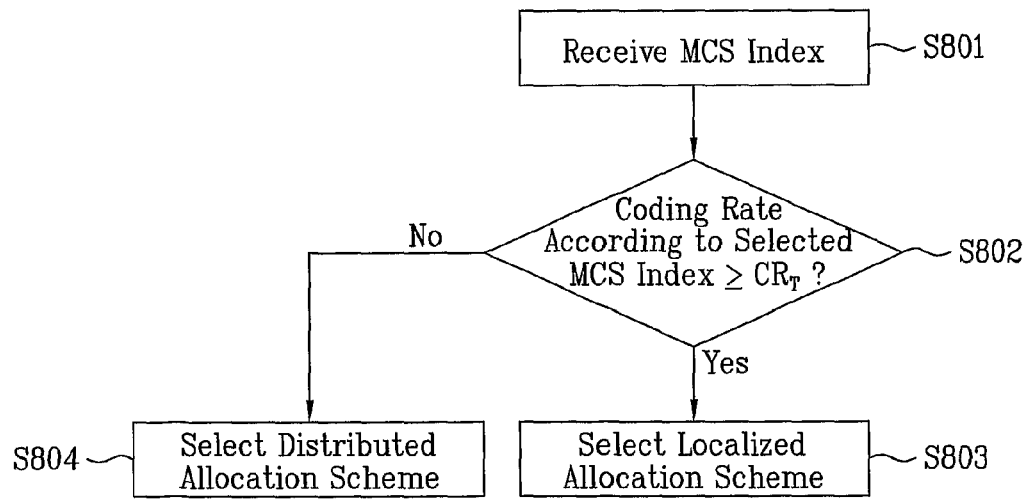
FIG. 8 is an exemplary diagram illustrating selection of the resource allocation scheme according to the coding rate of the selected MCS index.

FIG. 8 is an exemplary diagram illustrating selection of the resource allocation scheme according to the coding rate of the selected MCS index. Referring to FIG. 8, the information associated with the MCS index is received (S801). The receiving end or the transmitting end can select the MCS index based on the feedback information. Using the selected MCS index, the MCS used for channel coding and modulation can be determined.

Thereafter, a determination can be made as to whether the coding rate of the selected MCS index is greater than (or equal to) a specified coding rate threshold ($CR_T$) (S802). If the MCS index is greater than (or equal to) the specified coding rate threshold ($CR_T$), the localized resource allocation scheme can be selected in the transmitting end (S803). Alternatively, if the MCS index is less than the specified coding rate threshold ($CR_T$), the distributed resource allocation scheme can be selected in the transmitting end (S804).

The resource allocation scheme according to the selected resource allocation scheme as discussed in FIG. 8 can be applied in a system employing adaptive resource allocation scheme.

As discussed with respect to FIGS. 7 and 8 regarding selectively determining between the resource allocation scheme and the MCS index selection of the AMC scheme based on the relationship between the two, the link performance and the processing rate of the system can be enhanced.

Figure 9:
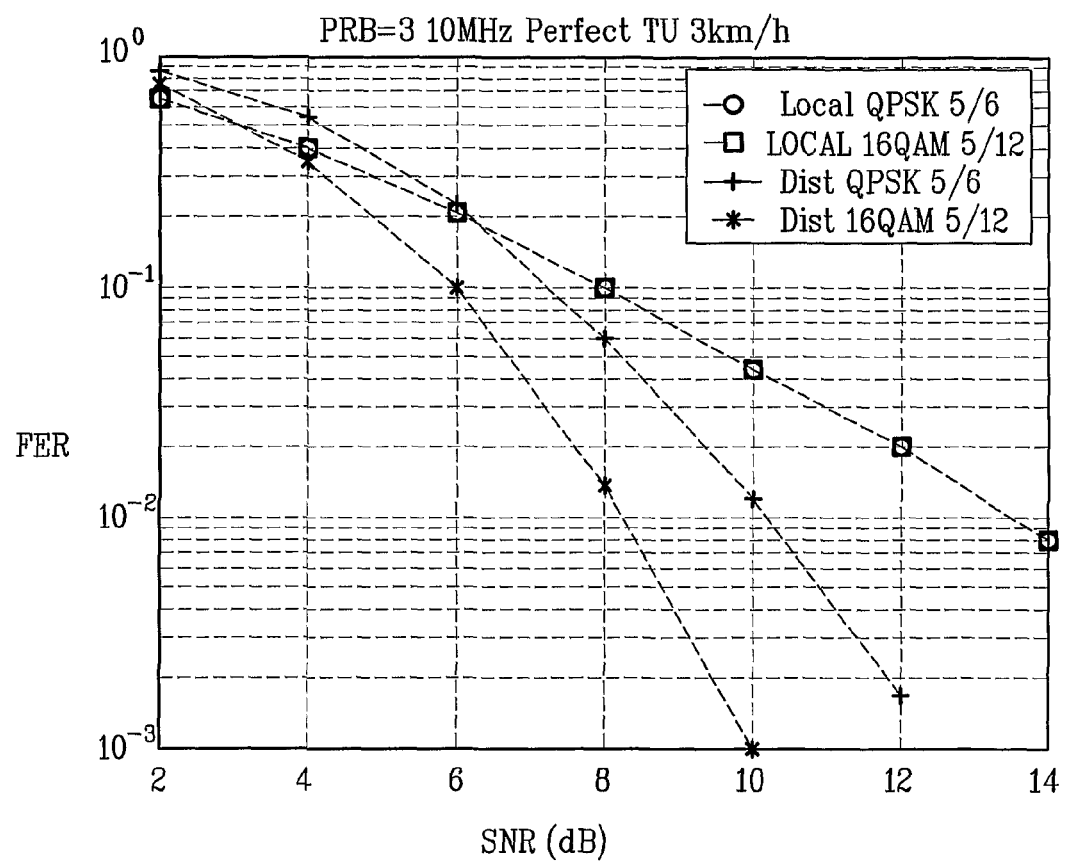
FIG. 9 is an exemplary graph illustrating comparison of performances of various MCS when the frequency selectivity of the receiving channel is large.

FIG. 9 is an exemplary graph illustrating comparison of performances of various MCS when the frequency selectivity of the receiving channel is large. With respect to FIG. 9, unlike the examples of FIGS. 7 and 8 in which the frequency selectivity was not considered, factors such as the frequency selectivity of the receiving channel is considered in determining the resource allocation scheme so as to further improve the performance of system.

Referring to FIG. 9, there are a relatively large number of multi-paths of channels and relatively shorter coherence bandwidth compared to FIGS. 5 and 6. In other words, FIG. 9 illustrates the system performance in the TU environment, in which the frequency selectivity of the receiving channel is large and the same MCS index as that of FIG. 6 is applied.

More specifically, the two examples or embodiments discussed with respect to FIG. 9 in which the frequency selectivity of the receiving channel is large, better FER performance can be attained compared to two types of distributed resource allocation scheme discussed in FIG. 6 in which the frequency selectivity is relatively smaller. The reason for better performance is that the frequency diversity gain increases proportionally the size of the frequency selectivity when using the distributed resource allocation scheme.

In FIG. 9, the application of the low channel coding rate (e.g., 16QAM, 5/12 coding rate) provides relatively better FER performance than the high channel coding rate (e.g., QPSK, 5/6 coding rate), assuming that the frequency efficiency are uniform. Here, compared to the results of FIG. 6, it is evident that the result of FIG. 9 is relatively significant. The difference here can be attributed to the change in frequency diversity with respect to the number of multi-paths of the channel and/or coherence bandwidth. In other words, if the number of multi-paths increases and/or the coherence bandwidth becomes shorter (i.e., larger frequency selectivity of the receiving channel), the low coding rate of the MCS index may be used for higher gain. Alternatively, if the number of multi-paths decreases and/or the coherence bandwidth becomes longer (i.e., smaller frequency selectivity of the receiving channel), the high coding rate of the MCS index may be used for higher gain.

Accordingly, it may be necessary for the transmitting end to select the resource allocation scheme and the MCS index based on the frequency selectivity of the receiving channel.

Figure 10:
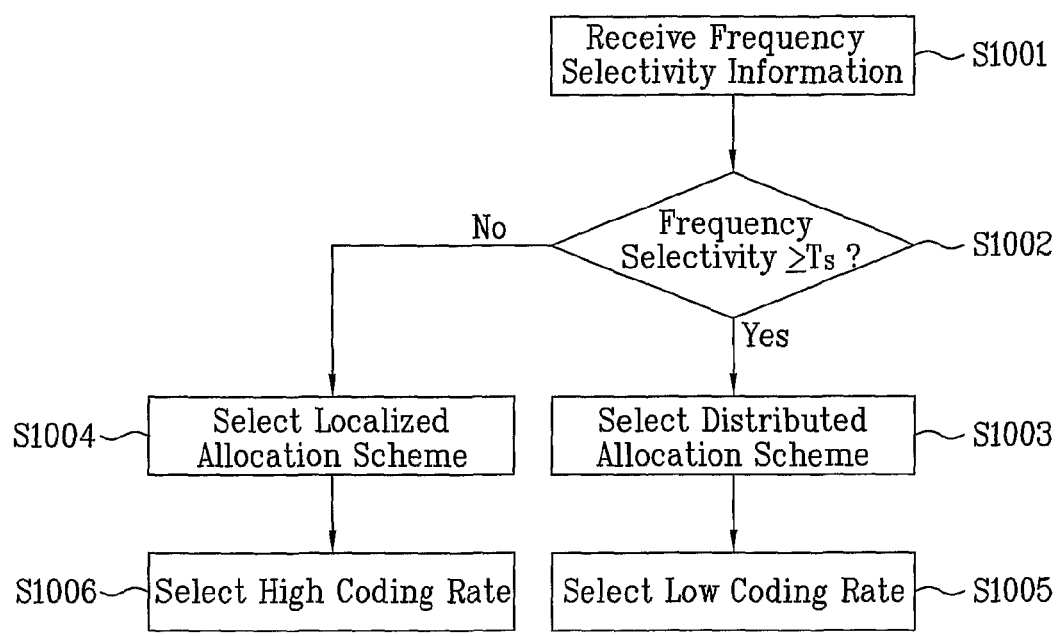
FIG. 10 is an exemplary diagram illustrating resource allocation scheme according to frequency selectivity of the receiving channel.

FIG. 10 is an exemplary diagram illustrating resource allocation scheme according to frequency selectivity of the receiving channel. Referring to FIG. 10, first, feedback information including the frequency selectivity of the channel is received by the transmitting end (S1001). For measuring the feedback information at the receiving end, various schemes or methods can be used including measuring the frequency selectivity using multi-path delay profile and/or coherence bandwidth. Moreover, power inclination of each subcarrier and/or power distribution value can also be used.

In order to measure the frequency selectivity of the channel, a correlator can be used to measure a level (or degree) of correlation between each subcarrier. The correlator can be used when it is difficult to measure the multi-path delay value or the coherence bandwidth value. At the same time, the correlator can be used to measure the level or degree of correlation between each OFDM subcarrier and determine the frequency selectivity of the channel. The following equation can be used to measure the level or degree of correlation between the OFDM subcarriers.

$$\sigma = \frac{1}{N} \sum_{n=1}^{N-m} h_n h_{n+m}^* \quad \text{[Equation 2]}$$

Here, σ denotes the correlation value between each subcarriers, N denotes a total number of subcarriers, n and in denote subcarrier index, and $h_n$ denotes channel response of nth subcarrier.

After calculating the correlation value by using an equation such as the one of Equation 2, the correlation value can be compared to a specified threshold value. If the calculated correlation value is greater than (or equal to) the specified threshold value, the frequency selectivity of the channel can be determined to be high, and conversely, if the calculated correlation value is smaller than the specified threshold value, the frequency selectivity of the channel can be determined to be low. Here, the channel response being used can be calculated using pilot symbols and/or preamble which are transmitted simultaneously during data transmission.

If the frequency selectivity of the receiving channel is large, the degree of correlation between the subcarrier channels is correspondingly large. Using this principal, it is possible to estimate the degree (or amount) of power correlation between each subcarrier channels for the frequency selectivity. The correlator can be estimated using the following equation.

$$w_1\left(\left|\frac{|h_m|^2 - |h_1|^2}{m-1}\right|\right) + w_2\left(\left|\frac{|h_{m+1}|^2 - |h_2|^2}{m-1}\right|\right) + \quad \text{[Equation 3]}$$
$$w_3\left|\frac{|h_{m+2}|^2 - |h_3|^2}{m-1}\right| + \ldots + W_{N-m+1}\left|\frac{|h_N|^2 - |h_{N+m+1}|^2}{m-1}\right|$$

Referring to Equation 3, the subscripts represent the subcarrier index, and the sum of $W_1$–$W_{N-m+1}$ equals 1. Using this equation, the correlation value can be attained. If the attained correlation value is greater than (or equal to) a specified threshold value, the frequency selectivity of the channel is determined to be large. Conversely, if the attained correlation value is less than the specified threshold value, then the frequency selectivity of the channel is determined to be small.

Furthermore, as another embodiment of the present invention, a power distribution value between each subcarrier index can be used to measure the frequency selectivity of the channel. If the frequency selectivity of the receiving channel is large, the power distribution of each subcarrier of the corresponding channel is also large and using this power distribution, the frequency selectivity can be estimated or measured. The power distribution value of each subcarriers can be measured using the following equation.

$$E[(|h_n|^2 - M)^2 = \quad \text{[Equation 4]}$$
$$\frac{(|h_1|^2 - M)^2}{N} + \frac{(|h_2|^2 - M)^2}{N} + \ldots + \frac{(|h_N|^2 - M)^2}{N}$$

Referring to Equation 4, M denotes the average value of the channel power, N denotes the total number of subcarriers, and $h_n$ denotes the channel response of the $n^{th}$ subcarrier.

If the power distribution value of the measured subcarrier is greater than (or equal to) a specified value, it can be determined that the frequency selectivity of the channel is large. However, if the power distribution value of the measured subcarrier is less than the specified value, it can be determined that the frequency selectivity of the channel is small.

As discussed, measuring of the frequency selectivity of the channel is not limited to the discussions of above and can be applied or implemented using other means and methods.

Referring to FIG. 10, after determining the frequency selectivity of the receiving channel (S1001), a determination is made as to whether the degree (or level) of the frequency selectivity is greater than or equal to than a specified frequency selectivity threshold ($T_S$) (S1002). Here, the specified frequency selectivity threshold ($T_S$) can be determined differently according to a method (or a scheme) for measuring the frequency selectivity.

If the frequency selectivity of the channel of S1002 is determined to be greater than (or equal to) the predetermined specified frequency selectivity threshold ($T_s$), a distributed resource allocation scheme can be selected (S1003). Alternatively, if the frequency selectivity of the channel of S1002 is determined to be less than the predetermined specified frequency selectivity threshold ($T_s$), a localized resource allocation scheme can be selected (S1004).

As discussed with respect to FIG. 9, the FER performance of the system can be improved by selecting the resource allocation scheme based on the frequency selectivity of the receiving channel. Moreover, as discussed with respect to FIG. 10, if the resource allocation scheme of the transmitting end is selected, the system performance can be further enhanced by selecting the MCS index for applying to the AMC scheme.

Subsequently, after the distributed resource allocation scheme is selected, a MCS index having low coding rate can be selected (S1005). Alternatively, after the localized resource allocation scheme is selected, a MCS index having high coding rate can be selected (S1006).

In S1105 and S1106, selecting of the low coding rate or the high coding rate relates to the predetermined MCS look-up table. That is, the coding rate and modulation rate having the same frequency efficiency from the MCS look-up table can be selected. Furthermore, the MCS index having a low coding rate and a high modulation rate or the MCS index having a high coding rate and a low modulation rate can be selected. However, the system may demand higher overall throughput over a good FER. In such as case, instead of using the predetermined MCS index set, the MCS level selection can be optimized so as to increase system throughput.

Hereafter, a more detailed description of the MCS index set, as it relates to predetermining the set, will be discussed. As discussed, the MCS index set includes MCS indices that have the same frequency efficiency within the MCS look-up table.

As described with respect to Table 3 and Table 4, the MCS look-up table can include the MCS level set having the same frequency efficiency. For example, the MCS level set 3 of Table 3 having index of QPSK, 2/3 coding rate has the same frequency efficiency as the MCS level set 5 of Table 3 having index of 16QAM, 1/3 coding rate. Furthermore, the MCS level set 6 of Table 3 having index of 16QAM, 1/2 coding rate has the same frequency efficiency as the MCS level set 9 having index of 64QAM, 1/3 coding rate.

In a discussion of another embodiment to follow, the MCS set (or the MCS level set) can be referred to as the MCS index set. Here, from a plurality of MCS level indices, the MCS set represented by two (2) MCS level indices having acceptable coding rate can be selected. The two (2) MCS level indices have the same frequency efficiency based on the degree (or level) of frequency selectivity. Accordingly, the MCS index set defined by Tables 3 and 4 can be expressed as follows, respectively.

TABLE 3

| Level | Modulation/Code rate | |
|---|---|---|
| 1 | QPSK 2/3 | 16QAM 1/3 |
| 2 | 16QAM 1/2 | 64QAM 1/3 |

TABLE 4

| Level | Modulation/Code rate | |
|---|---|---|
| 1 | QPSK 2/3 | 16QAM 1/3 |
| 2 | QPSK 5/6 | 64QAM 5/12 |
| 3 | 16QAM 3/4 | 64QAM 1/2 |

Figure 11:
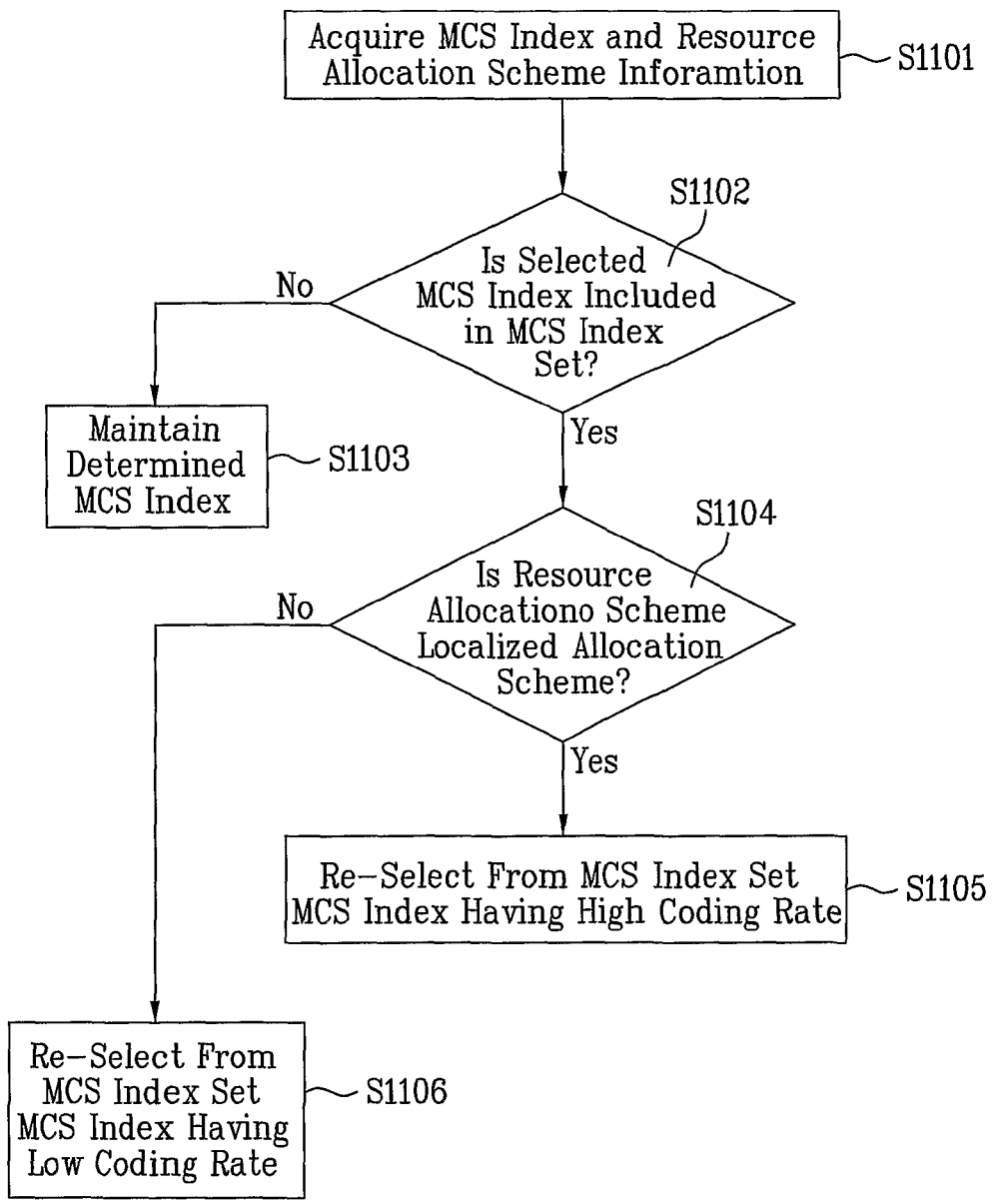
FIG. 11 is an exemplary diagram illustrating processes associated with MCS index selection.

FIG. 11 is an exemplary diagram illustrating processes associated with MCS index selection. More specifically, the MCS index set in which the MCS indices have the same frequency efficiency can be prescribed. Moreover, if the selected MCS index is from the MCS index set, the MCS index can be re-selected from the MCS index set according to the resource allocation scheme.

Referring to FIG. 11, the transmitting end can received feedback information which includes information regarding the selected MCS index and the resource allocation scheme from the receiving end (S1101). Subsequently, a determination can be made as to whether the selected MCS index is from (or included in) the MCS index set. If it is determined that the selected MCS index is not included or is not from the MCS index set, then the determined MCS index can be maintained.

However, if it is determined that the selected MCS index is from the MCS index set, then a determination can be made as to whether the resource allocation scheme is a localized resource allocation scheme or not (S1104). For example, if the existing MCS look-up table is the same as that of Table 1 and the determined MCS level index from S1103 is 3 (QPSK, 2/3 coding rate), since this is within the range of the predetermined MCS index set, MCS index can be re-selected from the MCS index set based on the resource allocation scheme.

In S1104, it is determined that the resource allocation scheme is the localized resource allocation scheme, the MCS index is can be re-selected. That is, since the selected MCS index may have coding rate that results in low frequency diversity gain, the selected MCS index can be re-selected with one having high coding rate from the MCS index set. Here, if the selected MCS index has high coding rate, then the selected MCS index can be used, but if the selected MCS index has low coding rate, then the selected MCS index can be re-selected with another MCS index from the MCS index set.

For example, assume that Table 1 is used as the MCS look-up table, Table 3 is used as the MCS index set, and MCS level index 3 (QPSK, 2/3 coding rate) is selected. If it determined that the localized resource allocation scheme is used, then this corresponds to high coding rate in the MCS index set of Table 3, and therefore, the selected MCS index 3 can be maintained or continued to be used.

If, however, it is determined that the resource allocation scheme is not the localized resource allocation scheme, then the MCS index having low coding rate from the MCS index set can be re-selected (S1106).

Figure 12:
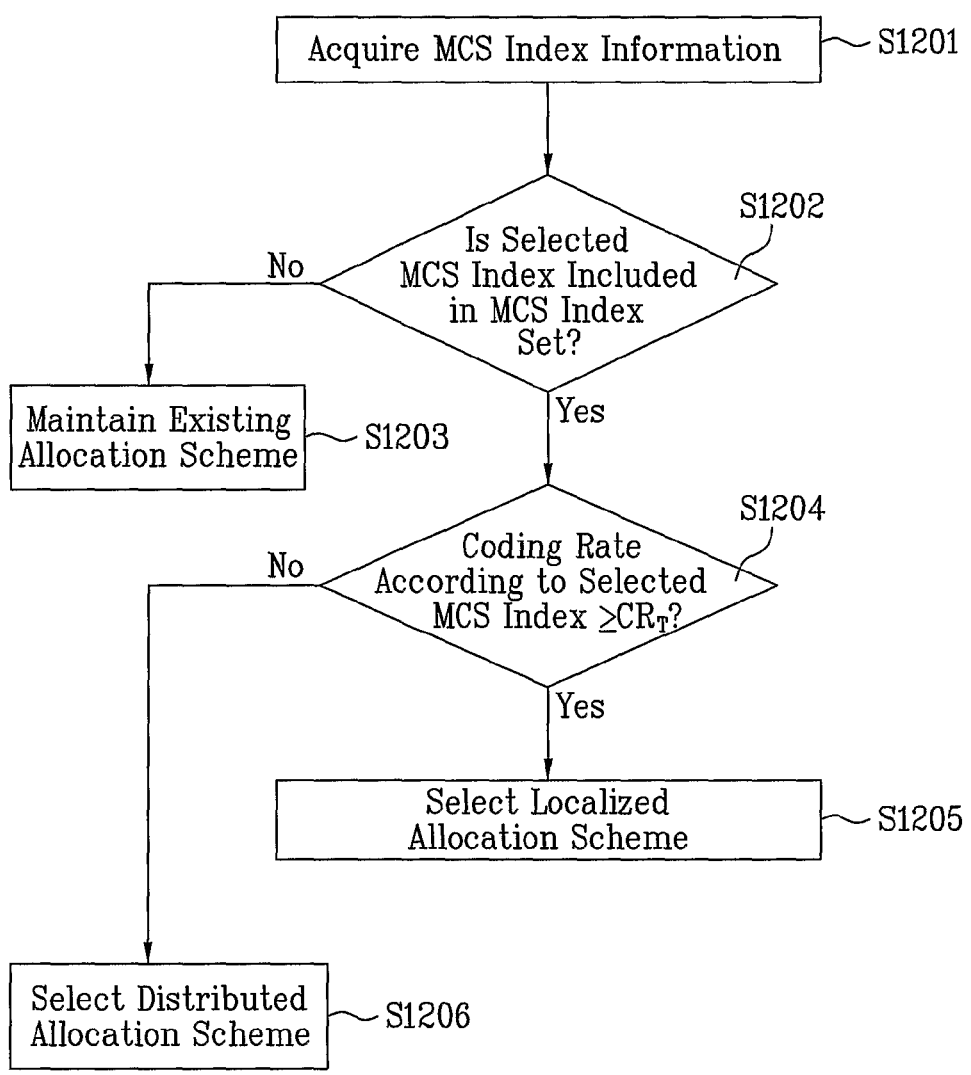
FIG. 12 is an exemplary diagram illustrating processes associated with selection of resource allocation scheme.

FIG. 12 is an exemplary diagram illustrating processes associated with selection of resource allocation scheme. More specifically, the transmitting end receives or acquires information associated with the selected MCS index, for example, via feedback information (s1201). Thereafter, a determination can be made as to whether the selected MCS index is included in the MCS index set (S1202). If it is determined that the selected MCS index is not included in the MCS index set, then the current or existing resource allocation scheme can be maintained (or continued to be used) (S1203).

However, if is determined that the selected MCS index is included in the MCS index set, then a further determination can be made as to whether a coding rate of the selected MCS index is greater than (or equal to) a specified coding rate threshold ($CR_T$) (S1204). Based on the determination, if it is determined that the coding rate of the selected MCS index is greater than (or equal to) the specified coding rate, then a localized resource allocation scheme can be selected (S1205). In the localized resource allocation scheme, generally, a relatively weaker channel coding is applied. Alternatively, if it is determined that the coding rate of the selected MCS index is less than the specified coding rate, then a distributed resource allocation scheme can be selected (S1206). In the distributed resource allocation scheme, a relatively stronger channel coding is applied so as to attain frequency diversity gain.

In short with respect to FIG. 12, the resource allocation scheme here can be applied to a system employing adaptive resource allocation scheme, which can change the resource allocation scheme according to the coding rate of the selected MCS index. Furthermore, the degree or level of frequency diversity gain varies according to the coding rate in the OFDM system. As such, if the MCS index selected based on signal-to-noise (SNR) ratio is used, it is possible that frequency diversity gain based on channel coding may not be fully achieved. Consequently, it may be difficult to optimize FER performance and/or transmission rate.

Figure 13:
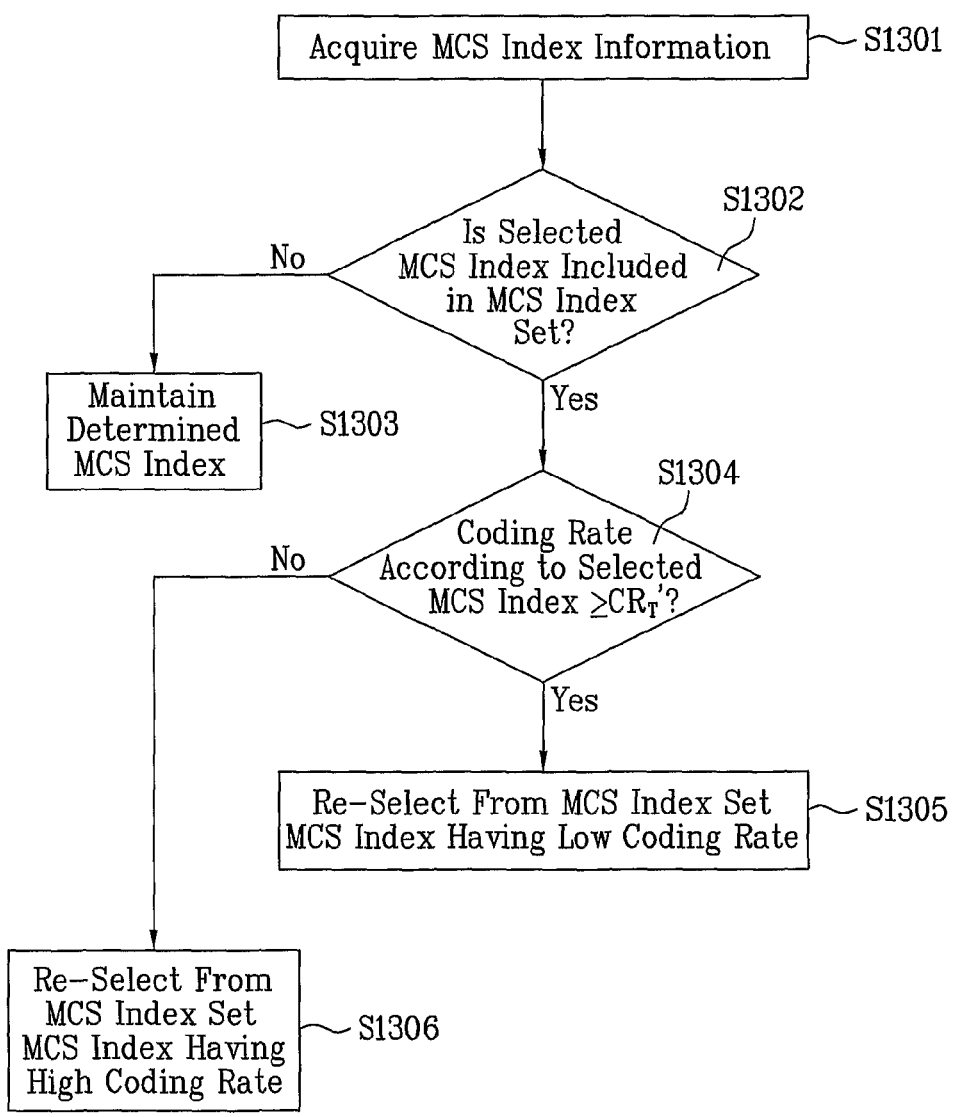
FIG. 13 is an exemplary diagram illustrating processes associated with re-selection of MCS index.

In order to better achieve frequency diversity gain in light of possible difficulties discussed above, the MCS index can be re-selected according to the coding rate of the selected MCS index. FIG. 13 is an exemplary diagram illustrating processes associated with re-selection of MCS index. Referring to FIG. 13, a MCS index set having the same frequency efficiency across the set can be preconfigured. After the MCS index is selected and if determined that the MCS index is from or is a part of the preconfigured MCS index set, then the MCS index can be adaptively re-selected.

More specifically, information related to the selected MCS index, based on information such as SNR of the receiving signal, can be received or acquired, for example, via feedback information (S1301). Subsequently, a determination can be made as to whether the selected MCS index is from (or included in) the MCS index set (S1302). Here, the MCS index set can be a group of MCS indices having the same frequency efficiency of the MCS look-up table.

If it is determined that the selected MCS index is not included in the MCS index set, the selected MCS index is maintained (S1303). However, if it is determined that the selected MCS index is included in the MCS index set, then further determination can be made as to whether the coding rate of the selected MCS index is greater than or equal to a specified coding rate threshold ($CR_T'$) (S1304). Here, the specified coding rate threshold ($CR_T'$) can be configured differently per system, that is, it ($CR_T'$) can be configured with a coding rate that can provide frequency diversity gain of a channel or can be configured differently according to the modulation rate. For example, in order to achieve frequency diversity gain, the specified coding rate threshold ($CR_T'$) can be set with 2/3 coding rate if QPSK and 1/3 coding rate if 16QAM.

If it is determined that the coding rate of the selected MCS index is greater than or equal to the specified coding rate threshold ($CR_T'$), the MCS index can be re-selected with a MCS index having low coding rate from the MCS index set (S1305). The re-selection of the MCS index can be further described by re-selecting (or maintaining) the currently selected MCS index if the selected MCS index corresponds to high modulation rate and low coding rate. However, if the selected MCS index corresponds to low modulation rate and high coding rate, the MCS index can be re-selected from the MCS index set with a MCS index having high modulation rate and low coding rate.

If it is determined that the coding rate of the selected MCS index is less than the specified coding rate threshold ($CR_T'$), the current or selected MCS index can be maintained (S1306). That is, the MCS index can be re-selected with the MCS index having high coding rate. Similarly, with respect to re-selection of the MCS index, the same MCS index can be re-selected or another MCS index can be selected.

Based on the re-selected modulation rate and the coding rate of the MCS index, an encoder and a mapper of the transmitting end can be controlled.

The following discussion relates to performance of the system with respect to re-selection of the MCS index based on a specified coding rate threshold. More specifically, the measured SNR of the received signal can be compared with a SNR threshold of a link curve table. Based on the comparison, a MCS index can be selected from a MCS look-up table. Tables 5 and 6 show examples of MCS look-up tables.

TABLE 5

| Index | Modulation | Code rate |
|---|---|---|
| 1 | QPSK | 1/12 |
| 2 | QPSK | 2/12 |
| 3 | QPSK | 3/12 |
| 4 | QPSK | 4/12 |
| 5 | QPSK | 5/12 |
| 6 | QPSK | 6/12 |
| 7 | QPSK | 7/12 |
| 8 | QPSK | 8/12 |
| 9 | QPSK | 9/12 |
| 10 | QPSK | 10/12 |
| 11 | QPSK | 11/12 |
| 12 | 16QAM | 1/12 |
| 13 | 16QAM | 2/12 |
| 14 | 16QAM | 3/12 |
| 15 | 16QAM | 4/12 |
| 16 | 16QAM | 5/12 |
| 17 | 16QAM | 6/12 |
| 18 | 16QAM | 7/12 |
| 19 | 16QAM | 8/12 |
| 20 | 16QAM | 9/12 |
| 21 | 16QAM | 10/12 |
| 22 | 16QAM | 11/12 |
| 23 | 64QAM | 1/12 |
| 24 | 64QAM | 2/12 |
| 25 | 64QAM | 3/12 |
| 26 | 64QAM | 4/12 |
| 27 | 64QAM | 5/12 |
| 28 | 64QAM | 6/12 |
| 29 | 64QAM | 7/12 |
| 30 | 64QAM | 8/12 |

TABLE 5-continued

| Index | Modulation | Code rate |
|---|---|---|
| 31 | 64QAM | 9/12 |
| 32 | 64QAM | 10/12 |
| 33 | 64QAM | 11/12 |

Based on the MCS look-up table of Table 5, if the MCS indices having the same frequency efficiencies are grouped (e.g., MCS index set), it can be represented as shown in Table 6.

TABLE 6

| Level | Modulation/Code rate | |
|---|---|---|
| 1 | QPSK 1/6 | 16QAM 1/12 |
| 2 | QPSK 2/3 | 16QAM 1/3 |
| 3 | QPSK 5/6 | 16QAM 5/12 |
| ... | ... | ... |

Here, with respect to Table 5, QPSK, 1/6 code rate of MCS index 2 and 16QAM, 1/12 code rate of MCS index 12 can be grouped as a MCS index set having the same frequency efficiency. Similarly, QPSK, 2/3 code rate of MCS index 8 and 16QAM, 1/3 code rate of MCS index 15 can be grouped as a MCS index set. Moreover, QPSK, 5/6 code rate of MCS index 10 and 16QAM, 5/12 code rate of MCS index 16 can be grouped as a MCS index set.

With respect to Table 6, the performance of the system can be affected based on the applied code rate in various channel environments. In the discussion to follow, the following graphs are based on 2/3 code rate for QPSK and 1/3 code rate for 16QAM.

Figure 14A:
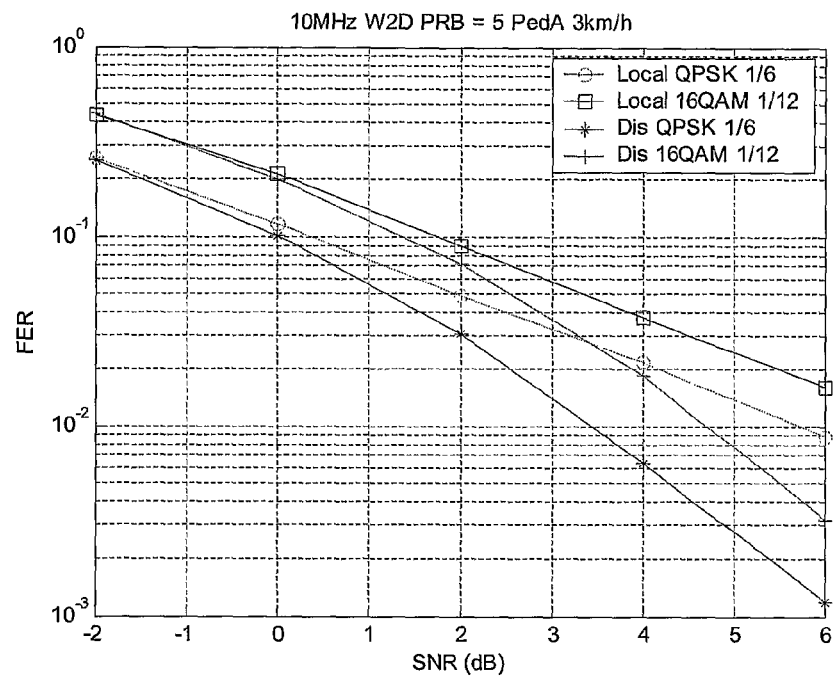
FIGS. 14A-14C are exemplary graphs illustrating performances of the system according to the applied code rates in channel environments having small frequency selectivity
Figure 14B:
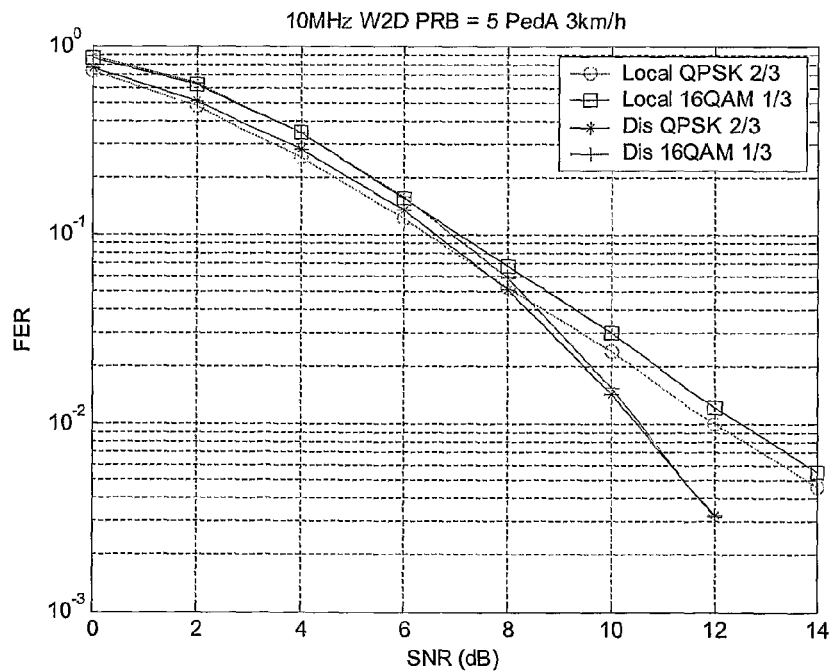
Figure 14C:
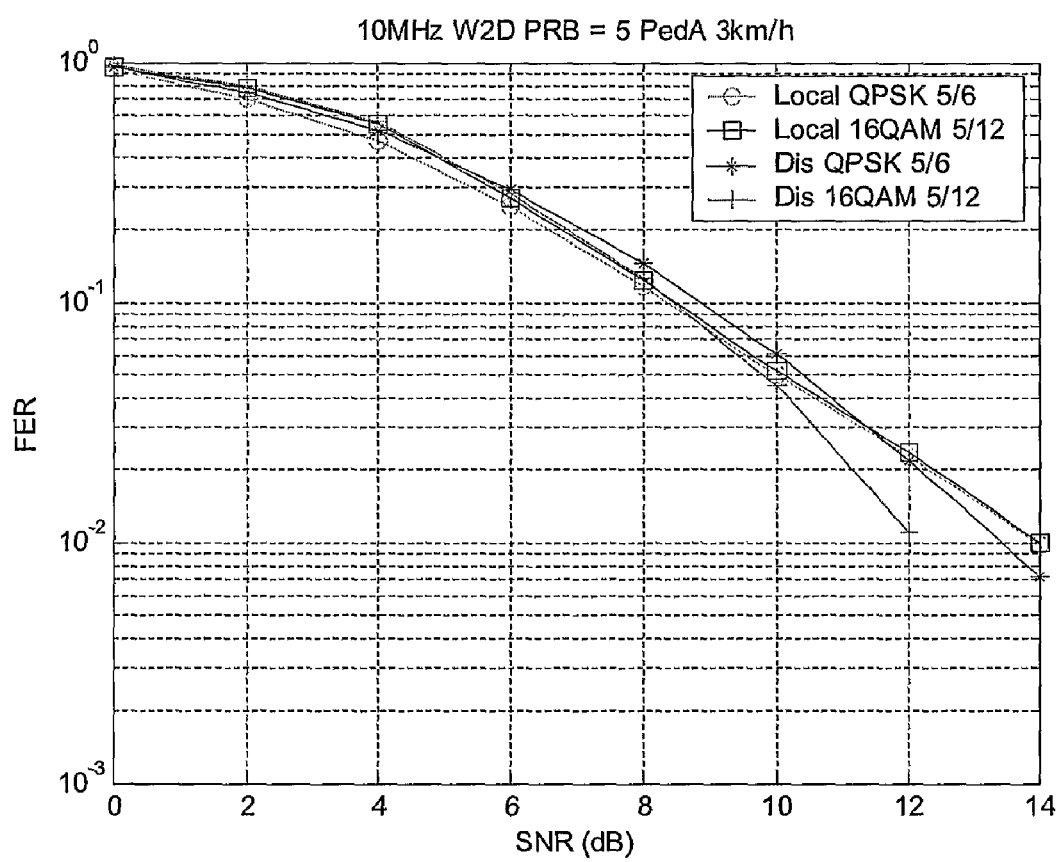

FIGS. 14A-14C are exemplary graphs illustrating performances of the system according to the applied code rates in channel environments having small frequency selectivity.

Referring to FIG. 14A, if the channel coding rate is less than the coding rate threshold (e.g., 1/6<2/3 for QPSK and 1/12<1/3 for 16QAM), it is shown that the FER performance is better if a MCS index having low modulation rate and high coding rate is used, irrespective of whether a localized or a distributed resource allocation scheme is used. With respect to FIG. 14B, there is not much difference in the system performance since the coding rate used for testing is similar to the coding rate threshold. Furthermore, since the coding rate used for testing is greater than the coding rate threshold, the FER performance is better if a MCS index having high modulation rate and low coding rate is used. Here, the performance gain is minimal because the localized resource allocation scheme, which lacks in achieving frequency diversity gain, cannot compensate for a channel environment having low frequency selectivity. As such, it is preferable to use a distributed resource allocation scheme in a channel environment having low frequency selectivity.

Figure 15A:
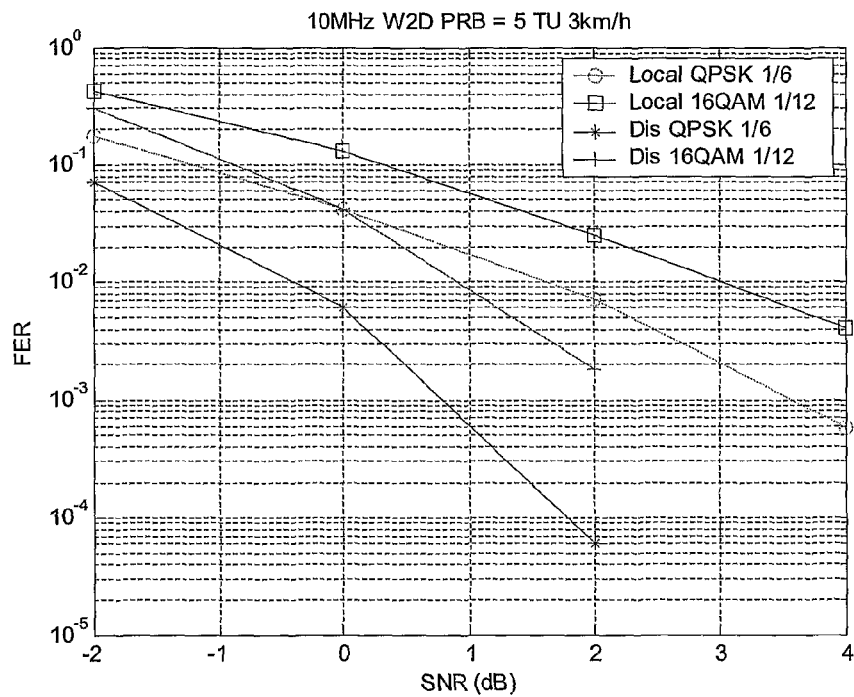
FIGS. 15A-15C are exemplary graphs illustrating performances of the system according to the applied code rates in channel environments having large frequency selectivity.
Figure 15B:
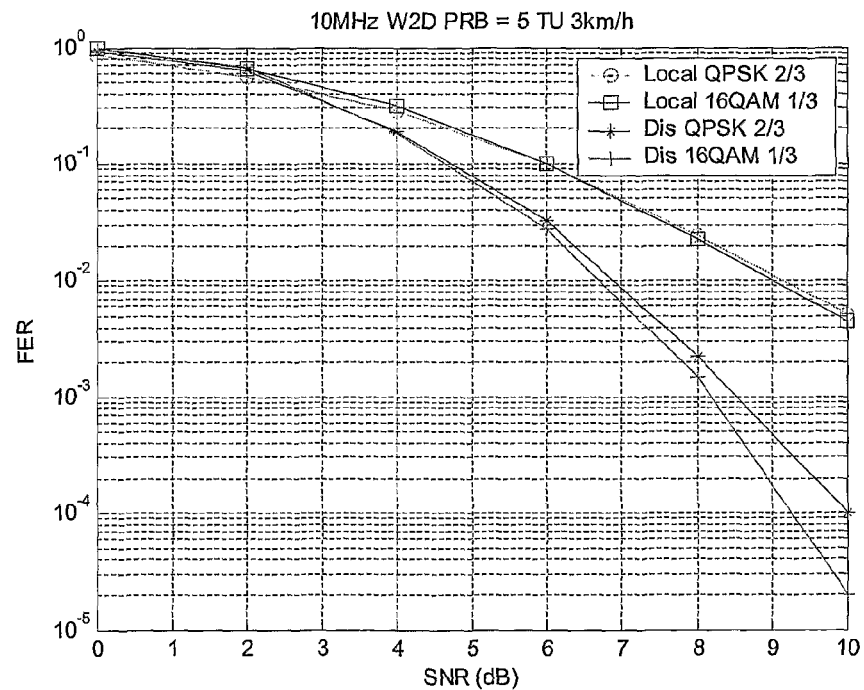
Figure 15C:
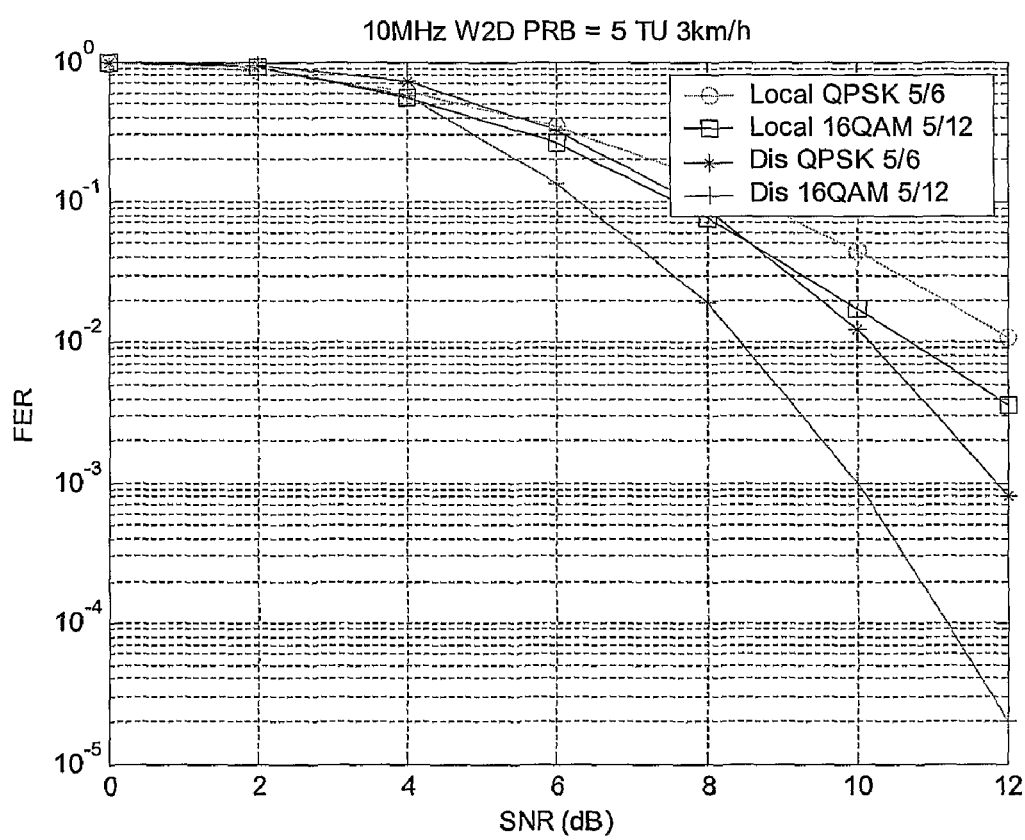

FIGS. 15A-15C are exemplary graphs illustrating performances of the system according to the applied code rates in channel environments having large frequency selectivity. Similarly, the MCS index set of Table 6 is also used in the discussion of FIGS. 15A-15C. Moreover, the graphs of FIGS. 15A-15C are based on 2/3 code rate for QPSK and 1/3 code rate for 16QAM.

With respect to FIGS. 15A-15C, as discussed with respect to FIGS. 14A-14C, if the applied coding rate is less than the coding rate threshold, the FER performance is better if the MCS index having low modulation rate and high coding rate is used. Furthermore, if the applied coding rate is greater than the coding rate threshold, the FER performance is better if the MCS index having high modulation rate and low coding rate is used.

In addition, with respect to FIG. 15C, performance gain is experienced when the localized resource allocation scheme is used due to taking advantage of high frequency diversity of channel environment having high frequency selectivity, despite inability of the localized resource allocation scheme to utilize frequency diversity. That is, system performance can be expected in OFDM system by re-selecting the MCS index.

The discussions of above can be applied to a single antenna system as well as a multiple antenna system such as a multi-input, multi-output (MIMO) system. Here, amount of calculation for a module associated with determining which resource allocation scheme is used and a module associated with re-selection of MCS may vary depending on a number of antennas at the transmitting end and the receiving end.

If the embodiments (or discussions) of above are applied in the multiple antenna system, the MCS level index, which considered independent application of resource allocation scheme for each transmit antenna, can be used for transmission and as a result, transmit diversity gain from the multiple transmit antennas can be optimized.

Moreover, the embodiments above can be applied to physical layer directly as well as to higher layers (e.g., medium access control layer). If the embodiments are applied to higher layers, these embodiments can be used in conjunction with other processes (e.g., AMC scheme, multi-user scheduling, or power control).

Further, with respect to discussions of FIGS. 11 and 12 in which the predetermined MCS index set is used, if it is deemed more important to increase the entire processing rate over improving FER performance, the MCS index set can be omitted, and instead increase system processing rate by optimizing the MCS level index.

For example, assuming that the distributed resource allocation scheme is applied and with respect to FIG. 6, if the transmitting end receives information related to QPSK, 5/6 coding rate, the MCS level index does not have to be changed to 16 QAM, 1/2 coding rate. Instead, if there is a MCS index or MCS level that has better frequency efficiency while having the same modulation rate (e.g., 16QAM), then that MCS index (e.g., 16QAM, 1/2 coding rate) can be used. Here, it is important that such a modification also satisfies the objective quality of service (QoS).

Here, from the perspective of increasing the system processing rate, if the FER performance can satisfy the objective QoS while transmitting large amount of data, the system performance can be optimized that much more. To this end, the MCS look-up table can be used, and a module that can compare or determine MCS level (or MCS index) having better frequency efficiency while satisfying the objective QoS can be used, preferably.

Figure 16:
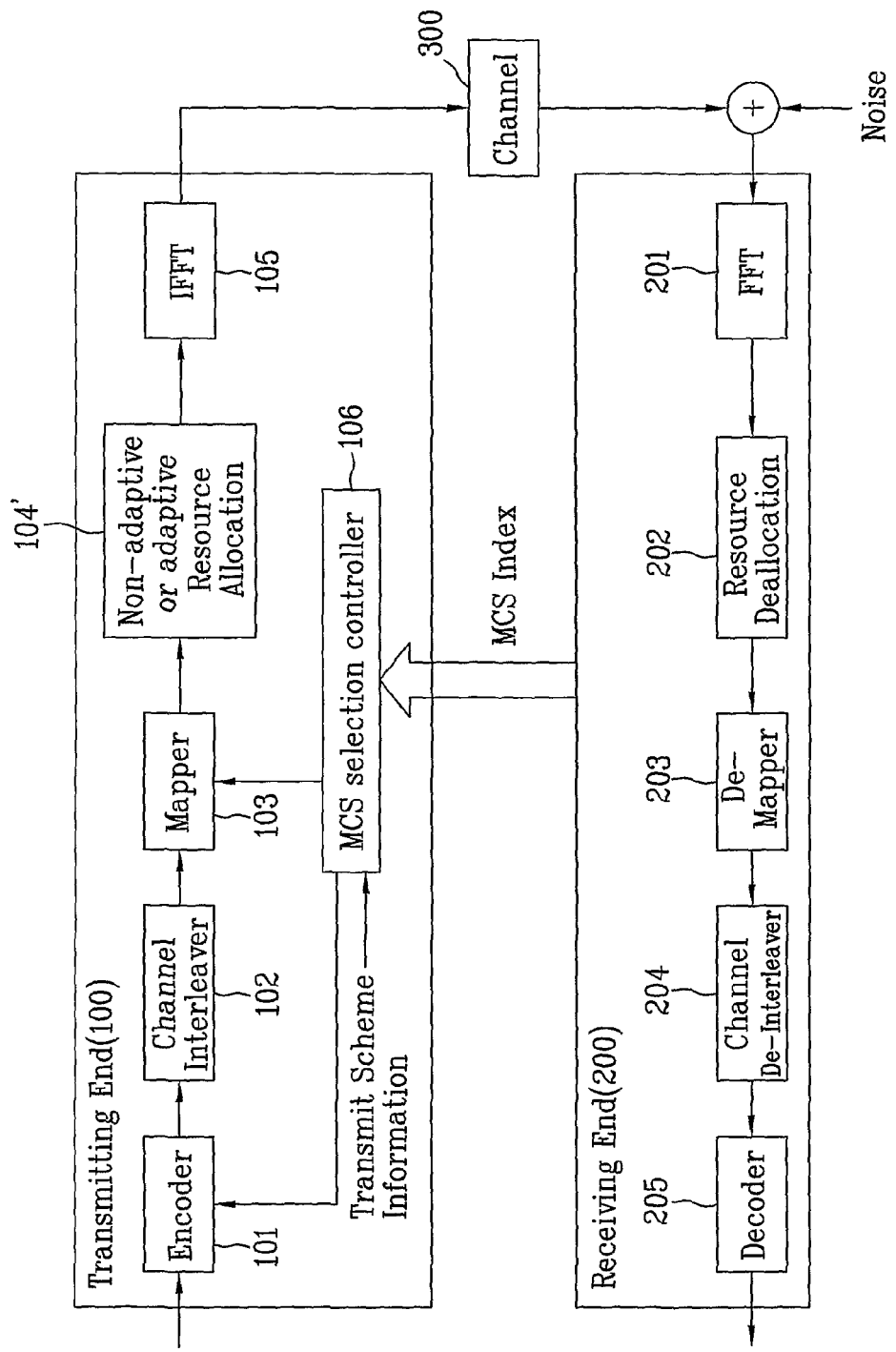
FIG. 16 is an exemplary diagram illustrating a transmitting end and a receiving end including a MCS selection controller for controlling MCS index according to the transmission scheme of the transmitting end.

FIG. 16 is an exemplary diagram illustrating a transmitting end and a receiving end including a MCS selection controller for controlling MCS index according to the transmission scheme of the transmitting end.

Referring to FIG. 16, the basic structure is same as that of FIG. 1. However, in the transmitting end, a MCS selection controller 106 is added and a non-adaptive or adaptive resource allocation module 104' is introduced in the transmitting end 100.

According to an embodiment of the present invention, the transmitting end 100 can receive information related to resource allocation scheme. If the resource allocation scheme is a localized resource allocation scheme, the MCS index having a coding rate greater than (or equal to) a specified coding rate threshold can be selected. Alternatively, if the resource allocation scheme is a distributed resource allocation scheme, the MCS having a coding rate less than the specified coding rate threshold can be selected. These processes or operations which are generally performed by the encoder 101 and the mapper 103 can be controlled by the MCS selection controller 106.

The resource allocation module 104' can be configured to use an adaptive resource allocation scheme or a non-adaptive resource allocation scheme. In other words, any one of the resource allocation schemes can be used.

Figure 17:
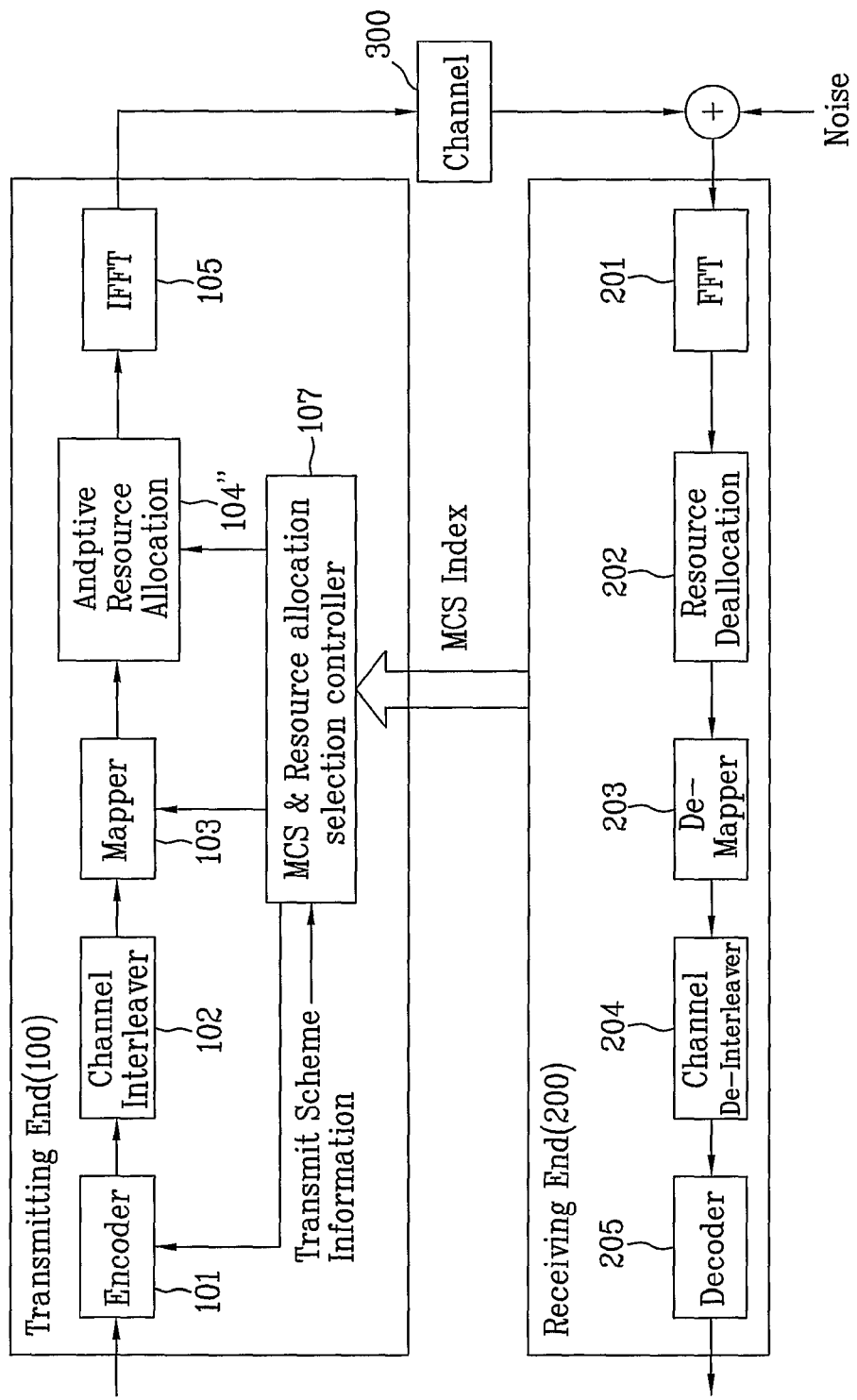
FIG. 17 is an exemplary diagram illustrating a transmitting end and a receiving end including a MCS and resource allocation selection controller.

FIG. 17 is an exemplary diagram illustrating a transmitting end and a receiving end including a MCS and resource allocation selection controller. The MCS and resource allocation selection controller 107 can be configured to control feedback information regarding MCS index, MCS index based on transmission scheme, and/or transmission scheme.

Referring to FIG. 17, the basic structure is same as that of FIG. 1. Further to the addition of the MCS and resource allocation selection controller 107, the transmitting end includes an adaptive resource allocation module 104".

In operation, the transmitting end 100 can receive information related to resource allocation scheme. If the resource allocation scheme is a localized resource allocation scheme, the MCS having a coding rate greater than (or equal to) a specified coding rate threshold can be selected. Alternatively, if the resource allocation scheme is a distributed resource allocation scheme, the MCS having a coding rate less than the specified coding rate threshold can be selected. Information related to these selections can be sent from the MCS and resource allocation selection controller 107 to the adaptive resource allocation module 104". Here, the MCS and resource allocation selection controller 107 carries out the selection of the MCS index selection and resource allocation concurrently.

Preferably, the resource allocation module is the adaptive resource allocation module 104" so that the MCS selection controller 106 and/or the MCS and resource allocation selection controller 107 of the transmitting end 100 can change the resource allocation scheme based on channel condition.

In addition, the MCS and resource allocation selection controller 107 can receive information related to MCS index and the frequency selectivity of the received channel. Based on this, the transmitting end 100 can determine whether the frequency selectivity is greater than (or equal to) the specified threshold. If it is, then the distributed allocation scheme can be selected. Conversely, if the frequency selectivity is less than the specified threshold, then the localized allocation scheme can be selected. Furthermore, if the distributed allocation scheme is selected, the MCS index can be re-selected with a MCS index having low coding rate. Lastly, if the localized allocation scheme is selected, the MCS index can be re-selected with a MCS index having high coding rate.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method of performing communicating at a transmitting side in a wireless communication system, the method comprising:

selecting one of a modulation and coding scheme (MCS) index according to a first scheme and a resource allocation scheme according to a second scheme; and using the selected one of the modulation and coding scheme (MCS) index and the resource allocation scheme to perform the communicating, wherein the resource allocation scheme comprises one of a localized resource allocation scheme that allocates data to subcarriers in a contiguous manner, and a distributed resource allocation scheme that allocates data to the subcarriers in a non-contiguous manner, wherein the first scheme includes:

selecting a MCS index having a coding rate that is greater than or equal to a coding rate threshold if a resource allocation scheme of the transmitting side employs a localized resource allocation scheme; and selecting a MCS index having a coding rate that is less than the coding rate threshold if the resource allocation scheme of the transmitting side employs a distributed resource allocation scheme, and wherein the second scheme includes:

selecting the localized resource allocation scheme as the resource allocation scheme by the transmitting side if a selected MCS index is the MCS index that has the coding rate that is greater than or equal to the coding rate threshold; and selecting the distributed resource allocation scheme as the resource allocation scheme by the transmitting side if the selected MCS index is the MCS index having the coding rate that is less than the coding rate threshold.

2. The method of claim 1, wherein the resource allocation scheme of the transmitting side is determined as the localized resource allocation scheme if at least a specified number of resource blocks are allocated contiguously in a frequency domain, and wherein the resource allocation scheme of the transmitting side is determined as the distributed resource allocation scheme if less than the specified number of resource blocks are allocated contiguously in the frequency domain.

3. The method of claim 1, wherein the resource allocation scheme is an adaptive resource allocation scheme.

4. The method of claim 1, further comprising:

receiving feedback information including the MCS index.

5. The method of claim 1, wherein the MCS index is included in a MCS index set that includes a plurality of MCS indices all having a same frequency efficiency.

6. A transmitting side apparatus for performing communicating in a wireless communication system, the transmitting side apparatus comprising:

selecting one of a modulation and coding scheme (MCS) index according to a first scheme and a resource allocation scheme according to a second scheme; and using the selected one of the modulation and coding scheme (MCS) index and the resource allocation scheme to perform the communicating, wherein the resource allocation scheme comprises one of a localized resource allocation scheme that allocates data to subcarriers in a contiguous manner, and a distributed resource allocation scheme that allocates data to the subcarriers in a non-contiguous manner, wherein the first scheme includes:

selecting a MCS index having a coding rate that is greater than or equal to a coding rate threshold if a resource allocation scheme of the transmitting side employs a localized resource allocation scheme; and selecting a MCS index having a coding rate that is less than the coding rate threshold if the resource allocation scheme of the transmitting side employs a distributed resource allocation scheme, and wherein the second scheme includes:

selecting the localized resource allocation scheme as the resource allocation scheme by the transmitting side if a selected MCS index is the MCS index having the coding rate that is greater than or equal to the coding rate threshold; and selecting the distributed resource allocation scheme as the resource allocation scheme by the transmitting side if the selected MCS index is the MSC index having the coding rate that is less than the coding rate threshold.

7. The transmitting side apparatus of claim 6, wherein the resource allocation scheme of the transmitting side is determined as the localized resource allocation scheme if at least a specified number of resource blocks are allocated contiguously in a frequency domain, and wherein the resource allocation scheme of the transmitting side is determined as the distributed resource allocation scheme if less than the specified number of resource blocks are allocated contiguously in the frequency domain.

8. The transmitting side apparatus of claim 6, wherein the resource allocation scheme is an adaptive resource allocation scheme.

9. The transmitting side apparatus of claim 6, wherein the controller is configured to receive feedback information including the MCS index.

10. The transmitting side apparatus of claim 6, wherein the MCS index is included in a MCS index set that includes a plurality of MCS indices all having a same frequency efficiency.

* * * * *